United States Patent
Katayama et al.

[11] Patent Number: 6,066,428
[45] Date of Patent: May 23, 2000

[54] ELECTROPHOTOGRAPHIC PHOTOCONDUCTOR AND AROMATIC POLYCARBONATE RESIN FOR USE THEREIN

[75] Inventors: Akira Katayama; Masaomi Sasaki; Katsukiyo Nagai; Chiaki Tanaka; Shinichi Kawamura; Tetsuro Suzuki, all of Shizuoka; Susumu Suzuka, Saitama; Katsuhiro Morooka, Ibaraki, all of Japan

[73] Assignee: Ricoh Company, Ltd., Tokyo, Japan

[21] Appl. No.: 09/100,247

[22] Filed: Jun. 19, 1998

[30] Foreign Application Priority Data

Jun. 19, 1997 [JP] Japan .................................. 9-162642
Jun. 19, 1997 [JP] Japan .................................. 9-162667

[51] Int. Cl.[7] ........................................ G03G 5/06
[52] U.S. Cl. ............................ 430/73; 430/58.7; 430/83
[58] Field of Search .................. 430/58.7, 73, 83

[56] References Cited

U.S. PATENT DOCUMENTS

| | | | |
|---|---|---|---|
| 5,486,439 | 1/1996 | Sakakibara et al. | 430/83 |
| 5,723,243 | 3/1998 | Sasaki et al. | 430/96 |
| 5,846,680 | 12/1998 | Adachi et al. | 430/58.7 |
| 5,871,876 | 2/1999 | Ikuno et al. | 430/58.7 |

*Primary Examiner*—Roland Martin
*Attorney, Agent, or Firm*—Oblon, Spivak, McClelland, Maier & Neustadt, P.C.

[57] ABSTRACT

An electrophotographic photoconductor has an electroconductive support, and a photoconductive layer which is formed on the support and contains as an effective component an aromatic polycarbonate resin having a structural unit of formula (I), or the structural unit of formula (I) and a structural unit of formula (II):

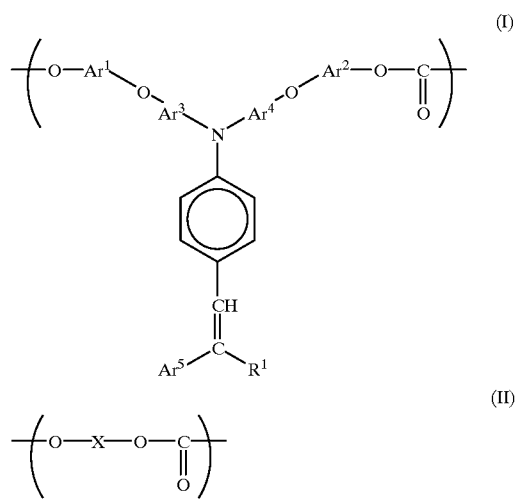

wherein $Ar^1$ to $Ar^5$, $R^1$, and X are as specified in the specification.

6 Claims, 6 Drawing Sheets

ELECTROPHOTOGRAPHIC PHOTOCONDUCTOR AND AROMATIC POLYCARBONATE RESIN FOR USE THEREIN

BACKGROUND OF THE INVENTION

1. Field of the Invention

The present invention relates to an electrophotographic photoconductor comprising an electroconductive support, and a photoconductive layer formed thereon, comprising an aromatic polycarbonate resin with charge transporting properties. In addition, the present invention also relates to the above-mentioned aromatic polycarbonate resin which is useful as the material for the electrophotographic photoconductor.

2. Discussion of Background

Recently organic photoconductors (OPC) are used in many copying machines and printers. The organic photoconductor has a layered structure comprising a charge generation layer (CGL) and a charge transport layer (CTL) which are successively overlaid on an electroconductive support. The charge transport layer (CTL) is a film-shaped layer comprising a binder resin and a low-molecular-weight charge transport material (CTM) dissolved therein. The addition of such a low-molecular-weight charge transport material (CTM) to the binder resin lowers the intrinsic mechanical strength of the binder resin, so that the CTL film is fragile and has a low tensile strength. Such lowering of the mechanical strength of the CTL causes the wearing of the photoconductor or forms scratches and cracks on the surface of the photoconductor.

Although some vinyl polymers such as polyvinyl anthracene, polyvinyl pyrene and poly-N-vinylcarbazole have been studied as high-molecular-weight photoconductive materials for forming a charge transporting complex for use in the conventional organic photoconductor, such polymers are not satisfactory from the viewpoint of photosensitivity.

In addition, high-molecular-weight materials having charge transporting properties have been also studied to eliminate the shortcomings of the above-mentioned layered photoconductor. For instance, there are proposed an acrylic resin having a triphenylamine structure as reported by M. Stolka et al., in "J. Polym. Sci., vol 21, 969 (1983)"; a vinyl polymer having a hydrazone structure as described in "Japan Hard Copy '89 p. 67"; an aromatic polycarbonate resin having a benzidine structure as disclosed in Japanese Laid-Open Patent Application 64-9964; and polycarbonate resins having a triarylamine structure as disclosed in U.S. Pat. Nos. 4,801,517, 4,806,443, 4,806,444, 4,937,165, 4,959,288, 5,030,532, 5,034,296, and 5,080,989, and Japanese Laid-Open Patent Applications Nos. 64-9964, 3-221522, 2-304456, 4-11627, 4-175337, 4-18371, 4-31404, and 4-133065. However, any materials have not yet been put to practical use.

According to the report of "Physical Review B46 6705 (1992)" by M. A. Abkowitz et al., it is confirmed that the drift mobility of a high-molecular weight charge transport material is lower than that of a low-molecular weight material by one figure. This report is based on the comparison between the photoconductor comprising a low-molecular weight tetraarylbenzidine derivative dispersed in the photoconductive layer and the one comprising a high-molecular polycarbonate having a tetraarylbenzidine structure in its molecule. The reason for this has not yet been clarified, but this report suggests that the photoconductor employing the high-molecular weight charge transport material produces poor results in terms of the photosensitivity and the residual potential although the mechanical strength of the photoconductor is improved.

Conventionally known representative aromatic polycarbonate resins are obtained by allowing 2,2-bis(4-hydroxyphenyl)propane (hereinafter referred to as bisphenol A) to react with phosgene or diphenylcarbonate. Such polycarbonate resins made from bisphenol A are used in many fields because of their excellent characteris-tics, such as high transparency, high heat resistance, high dimensional accuracy, and high mechanical strength.

For example, this kind of polycarbonate resin is intensively studied as a binder resin for use in the organic photoconductor in the field of electrophotography. A variety of aromatic polycarbonate resins have been proposed as the binder resins for use in the charge transport layer of the layered photoconductor.

As previously mentioned, however, the mechanical strength of the aforementioned aromatic polycarbonate resin is decreased by the addition of the low-molecular-weight charge transport material in the charge transport layer of the layered electrophotographic photoconductor.

SUMMARY OF THE INVENTION

It is therefore a first object of the present invention to provide an electrophotographic photoconductor free from the conventional shortcomings, which can show high photosensitivity and high durability.

A second object of the present invention is to provide an aromatic polycarbonate resin that is remarkably useful as a high-molecular-weight charge transport material for use in an organic electrophotographic photoconductor.

The above-mentioned first object of the present invention can be achieved by an electrophotographic photoconductor comprising an electroconductive support, and a photoconductive layer formed thereon comprising as an effective component an aromatic polycarbonate resin comprising a structural unit of formula (I):

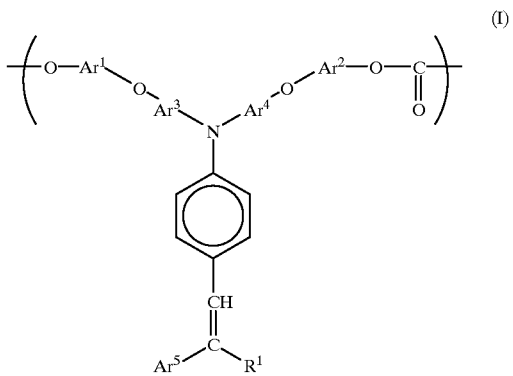

wherein $Ar^1$, $Ar^2$, $Ar^3$ and $Ar^4$ are each an arylene group which may have a substituent; $Ar^5$ is an aryl group which may have a substituent; and $R^1$ is a hydrogen atom, an alkyl group having 1 to 4 carbon atoms which may have a substituent, or an aryl group which may have a substituent.

In the above-mentioned photoconductor, the structural unit of formula (I) may be represented by the following formula (III):

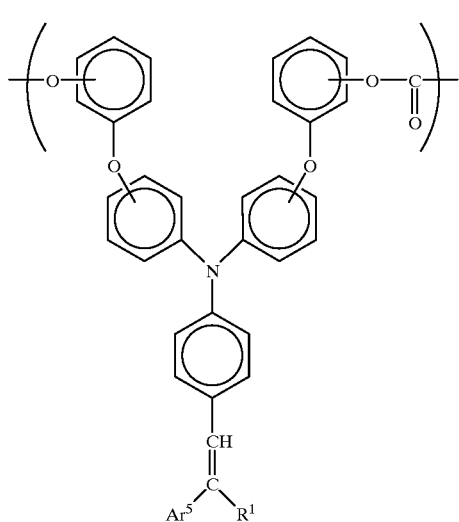

(III)

wherein $Ar^5$ and $R^1$ are the same as those previously defined in formula (I).

Further, the structural unit of formula (III) may be represented by formula (IV):

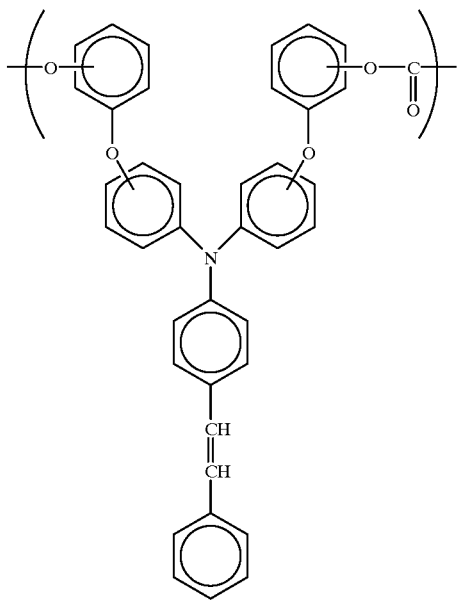

(IV)

The first object of the present invention can also be achieved by an electrophotographic photoconductor comprising an electroconductive support, and a photoconductive layer formed thereon comprising as an effective component an aromatic polycarbonate resin comprising the aforementioned structural unit of formula (I) and a structural unit of the following formula (II), with the composition ratio of the structural unit of formula (I) to the structural unit of formula (II) satisfying a relationship of $0 < k/(k+j) \leq 1$, wherein k is the moiety ratio of the structural unit of formula (I) and j is the moiety ratio of the structural unit of formula (II):

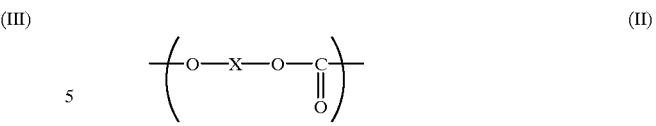

(II)

wherein X is a bivalent aliphatic group, a bivalent cyclic aliphatic group, a bivalent aromatic group, a bivalent group obtained by bonding the above-mentioned bivalent groups, or

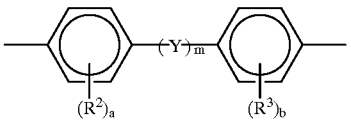

or

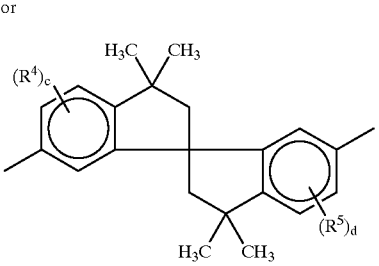

in which $R^2$, $R^3$, $R^4$ and $R^5$ are each independently an alkyl group which may have a substituent, an aryl group which may have a substituent, or a halogen atom; a and b are each independently an integer of 0 to 4; c and d are each independently an integer of 0 to 3; and a is an integer of 0 or 1, provided that when m=1, Y is a straight-chain alkylene group having 2 to 12 carbon atoms, —O—, —S—, —SO—, —SO$_2$—, —CO—,

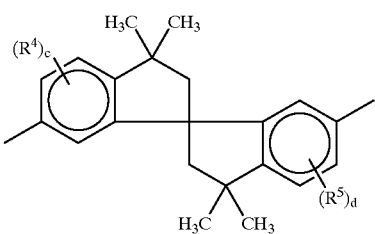

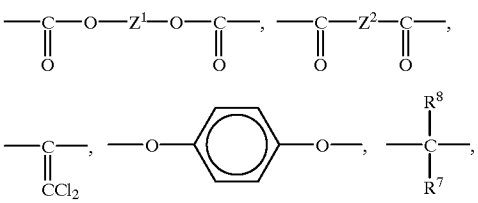

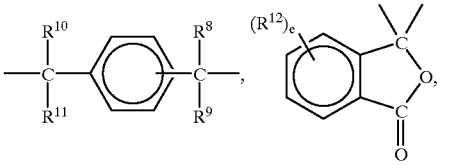

or

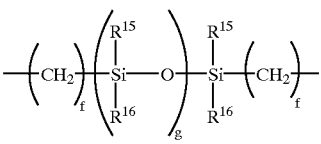

in which $Z^1$ and $Z^2$ are each a bivalent aliphatic group which may have a substituent or an arylene group which may have a substituent; and $R^6$, $R^7$, $R^8$, $R^9$, $R^{10}$, $R^{11}$ and $R^{12}$ are each independently a hydrogen atom, a halogen atom, an alkyl group having 1 to 5 carbon atoms which may have a substituent, an alkoxyl group having 1 to 5 carbon atoms which may have a substituent, or an aryl group which may have a substituent, and $R^6$ and $R^7$ may form a carbocyclic ring or heterocyclic ring having 6 to 12 carbon atoms together, or may form a carbocyclic ring or heterocyclic ring in combination with $R^2$ and $R^3$; p and q are each an integer of 0 or 1, provided that when p and q represent 1, $R^{13}$ and $R^{14}$ are each an alkylene group having 1 to 4 carbon atoms; $R^{15}$ and $R^{16}$ are each independently an alkyl group having 1 to 5 carbon atoms which may have a substituent, or an aryl group which may have a substituent; e is an integer of 0 to 4; f is an integer of 0 to 20; and g is an integer of 0 to 2000.

In the above-mentioned electrophotographic photoconductor, the structural unit of formula (I) for use in the photoconductive layer may be represented by the aforementioned structural unit of formula (III) or (IV).

The second object of the present invention can be achieved by an aromatic polycarbonate resin comprising a structural unit of formula (I):

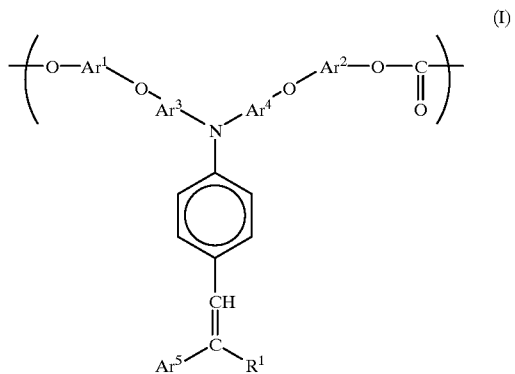

(I)

wherein $Ar^1$, $Ar^2$, $Ar^3$ and $Ar^4$ are each an arylene group which may have a substituent; $Ar^5$ is an aryl group which may have a substituent; and $R^1$ is a hydrogen atom, an alkyl group having 1 to 4 carbon atoms which may have a substituent, or an aryl group which may have a substituent.

In the above-mentioned polycarbonate resin, the structural unit of formula (I) may be represented by the above-mentioned formula (III), and preferably by the formula (IV).

The second object of the present invention can also be achieved by an aromatic polycarbonate resin comprising the aforementioned structural units of formulas (I) and (II), with the composition ratio of the structural unit of formula (I) to the structural unit of formula (II) satisfying a relationship of $0 < k/(k+j) \leq 1$, wherein k is the moiety ratio of the structural unit of formula (I) and j is the moiety ratio of the structural unit of formula (II).

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
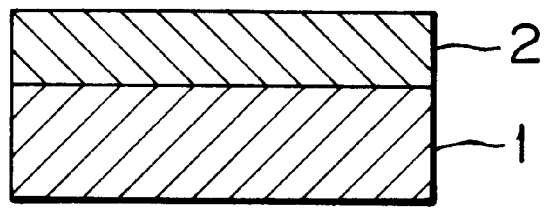
FIG. 1 is a schematic cross-sectional view of a first example of an electrophotographic photoconductor according to the present invention.

The electrophotographic photoconductor according to the present invention comprises a photoconductive layer comprising:
(i) an aromatic polycarbonate resin comprising at least a structural unit with the charge transporting properties, represented by formula (I), (III) or (IV),
(ii) an aromatic polycarbonate resin consisting of a structural unit with the charge transporting properties, represented by formula (I), (III) or (IV), and
(iii) an aromatic polycarbonate copolymer resin comprising a structural unit with the charge transporting properties, represented by formula (I), (III) or (IV), and a structural unit of formula (II) for imparting other properties than the charge transporting properties to the obtained resin.

Those aromatic polycarbonate resins, which are novel compounds, have charge transporting properties and high mechanical strength, so that the electrical, optical and mechanical characteristics required for the charge transport layer are satisfactory when those polycarbonate resins are employed in the photoconductor of the present invention.

As previously mentioned, the aromatic polycarbonate resin of the present invention comprises the structural unit of formula (I):

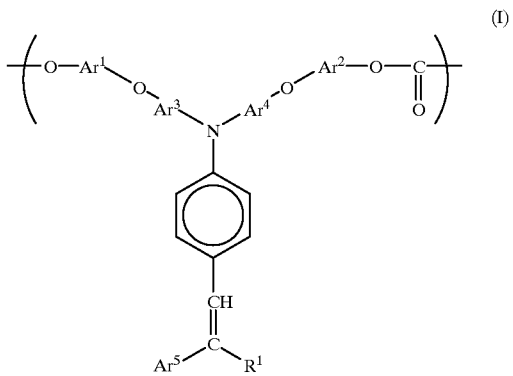

(I)

wherein $Ar^1$, $Ar^2$, $Ar^3$ and $Ar^4$ are each an arylene group which may have a substituent; $Ar^5$ is an aryl group which may have a substituent; and $R^1$ is a hydrogen atom, an alkyl group having 1 to 4 carbon atoms which may have a substituent, or an aryl group which may have a substituent.

It is preferable that the structural unit of formula (I) be represented by the following formula (III):

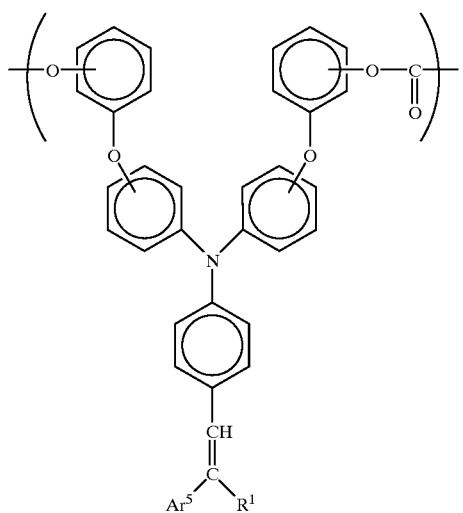

(III)

wherein $Ar^5$ and $R^1$ are the same as those previously defined in formula (I).

Further, the structural unit of formula (III) may be represented by formula (IV):

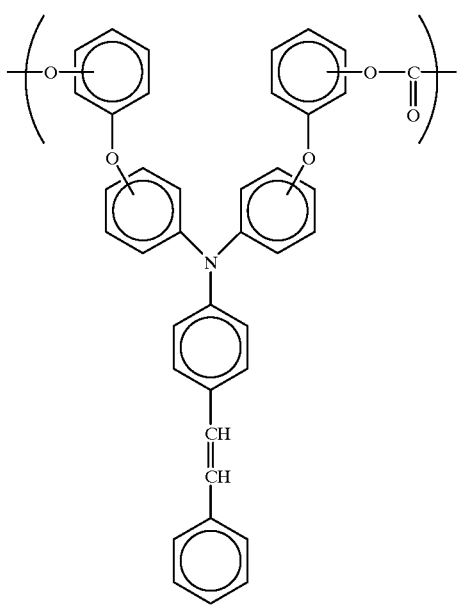

(IV)

Those aromatic polycarbonate resins according to the present invention can be obtained by the conventional synthesis method for the polycarbonate resin, that is, polymerization of a bisphenol with a carbonic acid derivative.

To be more specific, the aromatic polycarbonate resin of the present invention can be produced by subjecting at least one diol compound with the charge transporting properties, represented by the following formula (VI), (VII) or (VIII), and a halogenated carbonyl compound such as phosgene to interfacial polymerization.

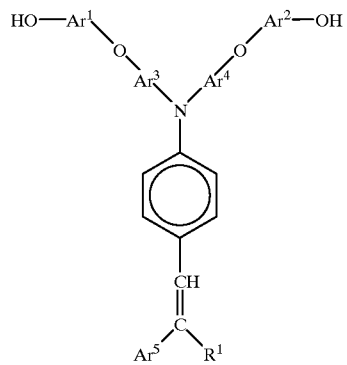

(VI)

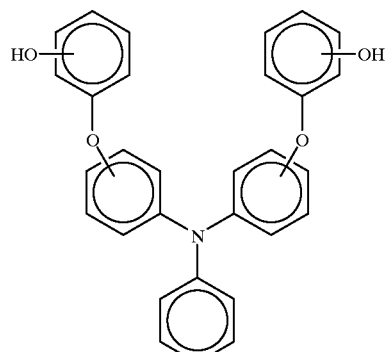

(VII)

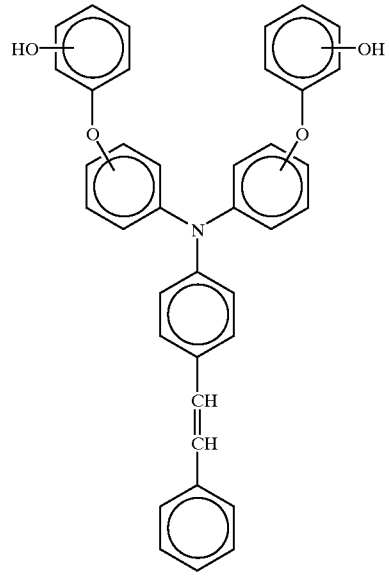

(VIII)

wherein $R^1$ and $Ar^1$ to $Ar^5$ are the same as those previously defined in formula (I).

In addition to the phosgene, trichloromethyl chloroformate that is a dimer of phosgene, and bis(trichloromethyl) carbonate that is a trimer of phosgene are usable as the halogenated carbonyl compounds in the above-mentioned interfacial polymerization. Further, halogenated carbonyl compounds derived from other halogen atoms than chlorine, for example, carbonyl bromide, carbonyl iodide and carbonyl fluoride are also employed.

The above-mentioned conventional synthesis method is described in the reference, such as "Handbook of Polycarbonate Resin" (issued by The Nikkan Kogyo Shimbun Ltd.).

When a diol of the following formula (IX) is employed in combination with the dial of formula (VI), (VII) or (VIII) with the charge transporting properties in the course of the polymerization, there can be produced a copolymer polycarbonate resin with improved mechanical characteristics. In this case, a plurality of kinds of diol compounds represented by formula (IX) may be employed.

OH—X—OH          (IX)

wherein X is the same as that previously defined in formula (II).

In such a synthesis method, the amount ratio of the dial represented by formula (VI), (VII) or (VIII) which is provided with the charge transporting properties to the diol of formula (IX) can be selected within a wide range in light of the desired characteristics of the obtained aromatic polycarbonate resin.

Further, a random copolymer polycarbonate resin can be obtained according to the polymerization procedure. For instance, a random copolymer comprising the structural unit of formula (I), (III) or (IV) and the structural unit of formula (II) can be obtained when the dial of formula (VI), (VII) or (VIII) with the charge transporting properties and the dial of formula (IX) are uniformly mixed prior to the condensation reaction with the phosgene.

The interfacial polymerization is carried out at the interface between two phases of an alkaline aqueous solution of a diol and an organic solvent which is substantially incompatible with water and capable of dissolving a polycarbonate therein in the presence of the carbonic acid derivative and a catalyst. In this case, a polycarbonate resin with a narrow molecular-weight distribution can be speedily obtained by emulsifying the reactive medium through high-speed stirring operation or addition of an emulsifying material.

As a base for preparing the alkaline aqueous solution, there can be employed an alkali metal and an alkaline earth metal. Specific examples of the base include hydroxides such as sodium hydroxide, potassium hydroxide and calcium hydroxide; and carbonates such as sodium carbonate, potassium carbonate, calcium carbonate and sodium hydrogencarbonate. Those bases may be used alone or in combination. Of those bases, sodium hydroxide and potassium hydroxide are preferable. In addition, distilled water or ion exchange water are preferably employed for the preparation of the above-mentioned alkaline aqueous solution.

Examples of the organic solvent used in the above-mentioned interfacial polymerization are aliphatic halogenated hydrocarbon solvents such as dichloromethane, 1,2-dichloroethane, 1,2-dichloroethylene, trichloro-ethane, tetrachloroethane and dichloropropane; aromatic halogenated hydrocarbon solvents such as chlorobenzene and dichlorobenzene; and mixed solvents thereof. Further, aromatic hydrocarbon solvents such as toluene, xylene and ethylbenzene, or aliphatic hydrocarbon solvents such as hexane and cyclohexane may be added to the above-mentioned solvents. Of those organic solvents, the aliphatic halogenated hydrocarbon solvents and aromatic halogenated hydrocarbon solvents, in particular, dichloromethane and chlorobenzene are preferable in the present invention.

Examples of the catalyst used in the preparation of the polycarbonate resin are a tertiary amine, a quaternary ammonium salt, a tertiary phosphine, a quaternary phosphonium salt, a nitrogen-containing heterocyclic compound and salts thereof, an iminoether and salts thereof, and a compound having amide group.

Specific examples of such a catalyst used in the interfacial polymerization include trimethylamine, triethylamine, tri-n-propylamine, tri-n-hexylamine, N,N,N',N'-tetramethyl-1,4-tetramethylenediamine, 4-pyrrolidinopyridine, N,N'-dimethylpiperazine, N-ethylpiperidine, benzyltrimethylammonium chloride, benzyltriethylammonium chloride, tetramethylammonium chloride, tetraethylammonium bromide, phenyltriethylammonium chloride, triethylphosphine, triphenylphosphine, diphenylbutylphosphine, tetra(hydroxymethyl) phosphonium chloride, benzyltriethylphosphonium chloride, benzyltriphenylphosphonium chloride, 4-methylpyridine, 1-methylimidazole, 1,2-dimethylimidazole, 3-methylpyridazine, 4,6-dimethylpyrimidine, 1-cyclohexyl-3,5-dimethylpyrazole, and 2,3,5,6-tetramethylpyrazine.

Those catalysts may be used alone or in combination. Of the above-mentioned catalysts, the tertiary amine, in particular, a tertiary amine having 3 to 30 carbon atoms, such as triethylamine is preferably employed in the present invention. Before and/or after the carbonic acid derivatives such as phosgene and bischloroformate are placed in the reaction system, any of the above-mentioned catalysts may be added thereto.

To control the molecular weight of the obtained polycarbonate resin, it is desirable to employ a terminator as a molecular weight modifier for any of the above-mentioned polymerization reactions. Consequently, a substituent derived from the terminator may be bonded to the end of the molecule of the obtained polycarbonate resin.

As the terminator for use in the present invention, a monovalent aromatic hydroxy compound and haloformate derivatives thereof, and a monovalent carboxylic acid and halide derivatives thereof can be used alone or in combination.

Specific examples of the monovalent aromatic hydroxy compound include phenols such as phenol, p-cresol, o-ethylphenol, p-ethylphenol, p-isopropylphenol, p-tert-butylphenol, p-cumylphenol, p-cyclohexylphenol, p-octylphenol, p-nonylphenol, 2,4-xylenol, p-methoxyphenol, p-hexyloxyphenol, p-decyloxyphenol, o-chlorophenol, m-chlorophenol, p-chlorophenol, p-bromophenol, pentabromophenol, pentachlorophenol, p-phenylphenol, p-isopropenylphenol, 2,4-di(1'-methyl-1'-phenylethyl)-phenol, β-naphthol, α-naphthol, p-(2',4',4'-trimethyl-chromanyl)phenol, and 2-(4'-methoxyphenyl)-2-(4"-hydroxyphenyl)propane. In addition, alkali metal salts and alkaline earth metal salts of the above phenols can also be employed.

Specific examples of the monovalent carboxylic acid include aliphatic acids such as acetic acid, propionic acid, butyric acid, valeric acid, caproic acid, heptanic acid, caprylic acid, 2,2-dimethylpropicnic acid, 3-methylbutyric acid, 3,3-dimethylbutyric acid, 4-methylvaleric acid, 3,3-dimethylvaleric acid, 4-methylcaproic acid, 3,5-dimethylcaproic acid and phenoxyacetic acid; and benzoic acids such as p-methylbenzoic acid, p-tert-butylbenzoic acid, p-butoxybenzoic acid, p-octyloxybenzoic acid, p-phenylbenzoic acid, p-benzylbenzoic acid and p-chlorobenzoic acid. In addition, alkali metal salts and alkaline earth metal salts of the above-mentioned aliphatic acids and benzoic acids can also be employed as the terminators.

Of those terminators, the monovalent aromatic hydroxy compound, in particular, phenol, p-tert-butylphenol, or p-cumylphenol is preferable.

It is preferable that the thus obtained aromatic polycarbonate resin for use in the photoconductor of the present invention have a number-average molecular weight of 1,000 to 500,000, more preferably in the range of 10,000 to 200,000 when expressed by the styrene-reduced value.

Furthermore, a branching agent may be added in a small amount during the polymerization in order to improve the mechanical properties of the obtained polycarbonate resin. Any compounds that have three or more reactive groups, which may be the same or different, selected from the group consisting of an aromatic hydroxyl group, a haloformate group, a carboxylic acid group, a carboxylic acid halide group, and an active halogen atom can be used as the branching agent for use in the present invention.

Specific examples of the branching agent for use in the present invention are as follows:

phloroglucinol, 4,6-dimethyl-2,4,6-tris(4'-hydroxyphenyl)-2-heptene, 4,6-dimethyl-2,4,6-tris(4'-hydroxyphenyl)heptane, 1,3,5-tris(4'-hydroxyphenyl)benzene, 1,1,1-tris(4'-hydroxyphenyl)ethane, 1,1,2-tris(4'-hydroxyphenyl)propane, α,α,α'-tris (4'-hydroxyphenyl)-1-ethyl-4-isopropylbenzene, 2,4-bis[α-methyl-α-(4'-hydroxyphenyl)ethyl]phenol, 2-(4'-hydroxyphenyl)-2-(2", 4"-dihydroxyphenyl)propane, tris(4-hydroxyphenyl)phosphine, 1,1,4,4-tetrakis(4'-hydroxyphenyl)cyclohexane, 2,2-bis[4',4'-bis(4"-hydroxyphenyl)cyclohexyl]propane, α,α,α',α'-tetrakis(4'-hydroxyphenyl)-1,4-diethylbenzene, 2,2,5,5-tetrakis(4'-hydroxyphenyl) hexane, 1,1,2,3-tetrakis(4'-hydroxyphenyl)propane, 1,4-bis(4',4"-dihydroxytriphenylmethyl)benzene, 3,3',5,5'-tetrahydroxydiphenyl ether, 3,5-dihydroxybenzoic acid, 3,5-bis(chlorocarbonyloxy)benzoic acid, 4-hydroxyisophthalic acid, 4-chlorocarbonyloxyisophthalic acid, 5-hydroxyphthalic acid, 5-chlorocarbonyloxyphthalic acid, trimesic trichloride, and cyanuric chloride.

Those branching agents may be used alone or in combination.

To prevent the oxidation of the diol in the alkaline aqueous solution, an antioxidant such as hydrosulfite may be used for the interfacial polymerization reaction.

The interfacial polymerization reaction is generally carried out at temperature in the range of 0 to 40° C., and terminated in several minutes to 5 hours. It is desirable to maintain the reaction system to pH 10 or more.

The polycarbonate resin thus synthesized is purified by removing the catalyst and the antioxidant used in the polymerization; unreacted diol and terminator; and impurities such as an inorganic salt generated during the polymerization, and then subjected to the preparation of the photoconductive layer of the electrophotographic photoconductor according to the present invention. The previously mentioned "Handbook of Polycarbonate Resin" (issued by Nikkan Kogyo Shimbun Ltd.) can be referred to for such a procedure for purifying the polycarbonate resin.

To the aromatic polycarbonate resin produced by the previously mentioned method, various additives such as an antioxidant, a light stabilizer, a thermal stabilizer, a lubricant and a plasticizer can be added when necessary.

The structural unit of formula (I) for use in the polycarbonate resin according to the present invention will now be explained in detail.

$Ar^1$, $Ar^2$, $Ar^3$ and $Ar^4$ in the formula (I) represent a substituted or unsubstituted arylene group, which is derived from a substituted or unsubstituted aryl group.

Examples of the aryl group from which the above-mentioned arylene group is derived are phenyl group, naphthyl group, biphenylyl group, terphenylyl group, pyrenyl group, fluorenyl group, 9,9-dimethyl-2-fluorenyl group, azulenyl group, anthryl group, triphenylenyl group, chrysenyl group, fluorenylidenephenyl group, 5H-dibenzo[a,d]cycloheptenylidenephenyl group, thienyl group, benzothienyl group, furyl group, benzofuranyl group, carbazolyl group, pyridinyl group, pyrrolidyl group, and oxazolyl group.

Examples of the substituent for the above-mentioned aryl group include an alkyl group, an alkoxyl group, a halogen atom such as fluorine atom, chlorine atom, bromine atom or iodine atom, and an amino group represented by the following formula (X):

(X)

in which $R^{19}$ and $R^{20}$ are each an alkyl group which may have a substituent, or an aryl group which may have a substituent, and $R^{19}$ and $R^{20}$ may form a ring together, or in combination with the carbon atom of the aryl group. Namely, there can be employed piperidino group, morpholino group, and julolidyl group.

Examples of the alkyl group represented by $R^{19}$ and $R^{20}$ include a straight-chain or branched alkyl group having 1 to 5 carbon atoms. The above alkyl group may have a substituent such as a fluorine atom, cyano group, or a phenyl group which may have a substituent selected from the group consisting of a halogen atom and a straight-chain or branched alkyl group having 1 to 5 carbon atoms.

Specific examples of the above alkyl group include methyl group, ethyl group, n-propyl group, isopropyl group, tert-butyl group, sec-butyl group, n-butyl group, isobutyl group, trifluoromethyl group, 2-cyanoethyl group, benzyl group, 4-chlorobenzyl group, and 4-methylbenzyl group.

As the substituted or unsubstituted aryl group represented by $R^{19}$ and $R^{20}$, the same examples of the substituted or unsubstituted aryl group as those defined in the description of the arylene group represented by $Ar^1$, $Ar^2$, $Ar^3$ and $Ar^4$.

$Ar^5$ in formula (I) represents an aryl group which may have a substituent.

Examples of the aryl group represented by $Ar^5$ include a monovalent group derived from a heterocyclic group having an amine structure therein, such as a group represented by the following formula (XI), pyrrole, pyrazole, imidazole, triazole, dioxazole, indole, isoindole, benzimidazole, benzotriazole, benzoisoxazine, carbazole, and phenoxazine. Such an aryl group may have a substituent, for example, the same substituted or unsubstituted alkyl group as defined in the description of $R^{19}$ and $R^{20}$, the same substituted or unsubstituted aryl group as defined in the description of the arylene group represented by $Ar^1$ to $Ar^4$, and a halogen atom such as fluorine atom, chlorine atom, bromine atom or iodine atom.

The above-mentioned group represented by formula (XI) is as follows:

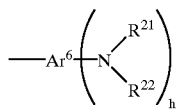
(XI)

wherein $R^{21}$ and $R^{22}$ are each an acyl group, an alkyl group which may have a substituent, or an aryl group which may have a substituent; $Ar^6$ is an arylene group; and h is an integer of 1 to 3.

In the aforementioned formula (XI), examples of the acyl group represented by $R^{21}$ and $R^{22}$ are acetyl group, propionyl group, and benzoyl group. As the alkyl group represented by $R^{21}$ and $R^{22}$, the same examples of the substituted or unsubstituted alkyl group as defined in the description of $R^{19}$ and $R^{20}$ can be employed.

As the aryl group represented by $R^{21}$ and $R^{22}$, there can be employed the same examples of the substituted or unsubstituted aryl group from which the substituted or unsubstituted arylene group can be derived, as defined in the description of $Ar^1$ to $Ar^4$, and a group represented by the following formula (XII):

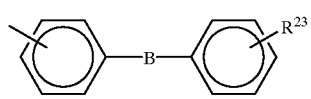
(XII)

wherein $R^{23}$ is a hydrogen atom, the same substituted or unsubstituted alkyl group as defined in the description of $R^{19}$ and $R^{20}$, an alkoxyl group, a halogen atom, the same substituted or unsubstituted aryl group from which the arylene group is derived as defined in the description of $Ar^1$ to $Ar^4$, amino group, nitro group or cyano group; and B is —O—, —S—, —SO—, —SO$_2$—, —CO—, or the following bivalent groups:

(XIII)

and

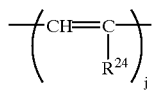
(XIV)

in which $R^{24}$ is a hydrogen atom, the same substituted or unsubstituted alkyl group as defined in the description of $R^{19}$ and $R^{20}$, or the same substituted or unsubstituted aryl group from which the arylene group is derived as defined in the description of $Ar^1$ to $Ar^4$; i is an integer of 1 to 12; and j is an integer of 1 to 3.

Specific examples of the alkoxyl group represented by $R^{23}$ are methoxy group, ethoxy group, n-propoxy group, isopropoxy group, n-butoxy group, isobutoxy group, s-butoxy group, t-butoxy group, 2-hydroxyethoxy group, 2-cyanoethoxy group, benzyloxy group, 4-methylbenzyloxy group and trifluoromethoxy group.

Specific examples of the halogen atom represented by $R^{23}$ are fluorine atom, chlorine atom, bromine atom and iodine atom.

As the amino group represented by $R^{23}$, there can be employed the previously mentioned amino group of formula (X) as defined in the description of the substituent of $Ar^1$ to $Ar^4$.

As the arylene group represented by $Ar^6$ in formula (XI), there can be employed the same examples of the substituted or unsubstituted arylene group represented by $Ar^1$ to $Ar^4$.

$R^1$ in formula (I) is a hydrogen atom, a substituted or unsubstituted alkyl group or a substituted or unsubstituted aryl group.

As the aryl group represented by $R^1$, there can be employed the same examples of the substituted or unsubstituted aryl group represented by $Ar^5$.

In other formulas than the formula (I), the same examples as defined in the description of formula (I) can be employed so long as the symbol such as $Ar^1$ or $R^1$ for use in the formula is identical.

In the present invention, there can be provided the aromatic polycarbonate resin of formula (I), preferably the polycarbonate resin of formula (III), more preferably that of formula (IV), and further preferably that of the following formula (V):

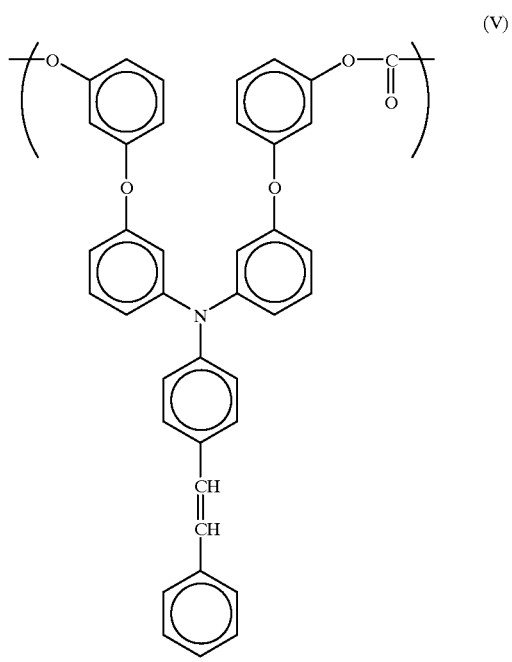
(V)

The diol of formula (VI), (VII) or (VIII) serving as the raw material monomer for the aromatic polycarbonate resin of the present invention is a novel compound.

For example, the diol of formula (VI) can be synthesized by allowing a diol of formula (XV), which is disclosed in Japanese Patent Application 7-323268, to react with compounds of formulas (XVI) and (XVII) to produce an ether compound represented by formula (XVIII) and carrying out the cleavage of ester groups in the ether compound of formula (XVIII) in accordance with the following reaction scheme:

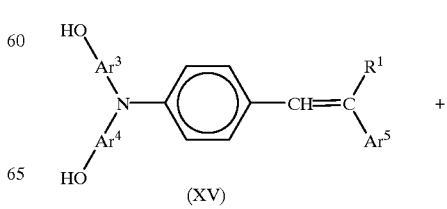
(XV)

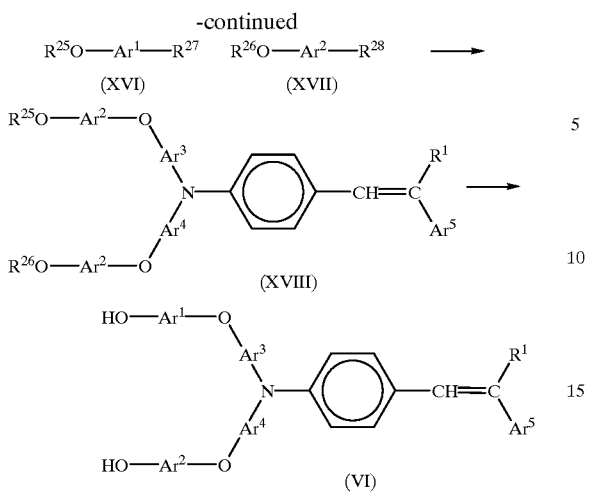

(XVIII)

(VI)

wherein $R^{25}$ and $R^{26}$ are each an alkyl group which may have a substituent; $R^{27}$ and $R^{28}$ are each a halogen atom; $Ar^1$, $Ar^2$, $Ar^3$, $Ar^4$, $Ar^5$ and $R^1$ are the same as those previously defined.

In the above reaction scheme, the stilbene compounds of formulas (XVIII) and (VI), which serve as the intermediates for the preparation of the aromatic polycarbonate resin of the present invention, are novel compounds.

According to the present invention, the polycarbonate resin for use in the photoconductive layer of the electrophotographic photoconductor comprises the structural unit of formula (I) which is provided with the charge transporting properties. To control the mechanical characteristics of the obtained polycarbonate resin, the polycarbonate resin in the form of a copolymer can be prepared by using the structural unit of formula (I) and the structural unit for use in the conventional polycarbonate resins, for example, as described in the previously mentioned "Handbook of Polycarbonate Resin" (issued by The Nikkan Kogyo Shimbun Ltd.). The previously mentioned structural unit of formula III), which is one of the structural units for use in the conventional polycarbonate resins, can be preferably employed in combination with the structural unit of formula (I) in the present invention.

The structural unit of formula (II) will now be explained by referring to the diol of formula (IX) that is the starting material for the structural unit of formula (II).

HO—X—OH          (IX)

In the case where X in the diol or formula (IX) represents a bivalent aliphatic group or bivalent cyclic aliphatic group, the representative examples of the obtained diol are as follows: ethylene glycol, diethylene glycol, triethylene glycol, polyethylene glycol, polytetramethylene ether glycol, 1,3-propanediol, 1,4-butanediol, 1,5-pentanediol, 3-methyl-1,5-pentanediol, 1,6-hexanediol, 1,5-hexanediol, 1,7-heptanediol, 1,8-octanediol, 1,9-nonanediol, 1,10-decanediol, 1,11-undecanediol, 1,12-dodecanediol, neopentyl glycol, 2-ethyl-1,6-hexanediol, 2-methyl-1,3-propanediol, 2-ethyl-1,3-propanediol, 2,2-dimethyl-1,3-propanediol, 1,3-cyclohexanediol, 1,4-cyclohexanediol, cyclohexane-1,4-dimethanol, 2,2-bis(4-hydroxycyclohexyl) propane, xylylenediol, 1,4-bis(2-hydroxyethyl)benzene, 1,4-bis(3-hydroxypropyl)benzene, 1,4-bis(4-hydroxybutyl) benzene, 1,4-bis(5-hydroxypentyl)benzene, and 1,4-bis(6-hydroxyhexyl)benzene.

In the case where X in the diol of formula (IX) represents a bivalent aromatic group, there can be employed any bivalent groups derived from the substituted or unsubstituted aryl group as defined in the description of $Ar^1$, $Ar^2$, $Ar^3$ and $Ar^4$. In addition, X represents the following bivalent groups:

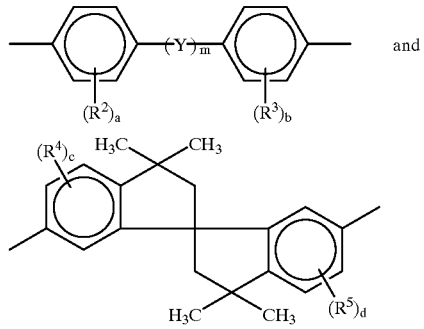

in which $R^2$, $R^3$, $R^4$ and $R^5$ are each independently an alkyl group which may have a substituent, an aryl group which may have a substituent, or a halogen atom; a and b are each independently an integer of 0 to 4; c and d are each independently an integer of 0 to 3; and m is an integer of 0 or 1, provided that when m=1, Y is a straight-chain alkylene group having 2 to 12 carbon atoms, —O—, —S—, —SO—, —SO$_2$—, —CO—,

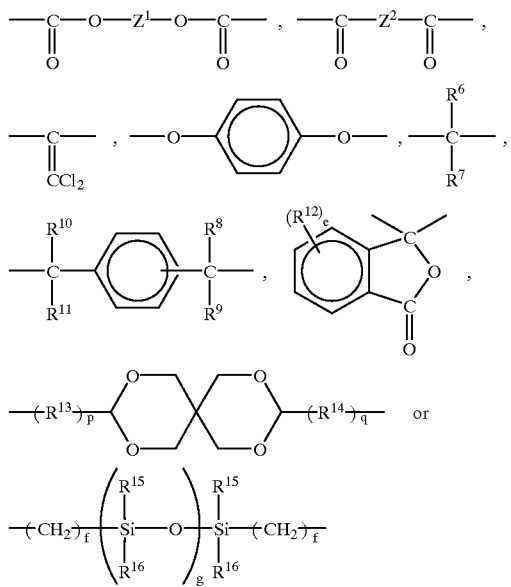

in which $Z^1$ and $Z^2$ are each a bivalent aliphatic group which may have a substituent or an arylene group which may have a substituent; and $R^6$, $R^7$, $R^8$, $R^9$, $R^{10}$, $R^{11}$ and $R^{12}$ are each independently a hydrogen atom, a halogen atom, an alkyl group having 1 to 5 carbon atoms which may have a substituent, an alkoxyl group having 1 to 5 carbon atoms which may have a substituent, or an aryl group which may have a substituent, and $R^6$ and $R^7$ may form a carbocyclic ring or heterocyclic ring having 6 to 12 carbon atoms together, or may form a carbocyclic ring or heterocyclic ring in combination with $R^2$ and $R^3$; p and q are each an integer of 0 or 1, provided that when p and q represent 1, $R^{13}$ and $R^{14}$ are each an alkylene group having 1 to 4 carbon atoms; $R^{15}$ and $R^{16}$ are each independently an alkyl group having 1 to 5 carbon atoms which may have a substituent, or an aryl group which may have a substituent; e is an integer of 0 to 4; f is an integer of 0 to 20; and g is an integer of 0 to 2000.

In the above-mentioned bivalent groups, the same substituted or unsubstituted alkyl group as defined in the description of $R^{19}$ and $R^{20}$, and the same substituted or unsubstituted aryl group as defined in the description of $Ar^1$, $Ar^2$, $Ar^3$ and $Ar^4$ can be employed.

Examples of the halogen atom in the above bivalent groups include a fluorine atom, a chlorine atom, a bromine atom and an iodine atom.

When $Z^1$ and $Z^2$ each represents a substituted or unsubstituted bivalent aliphatic group, there can be employed any bivalent groups obtained by removing the hydroxyl groups from the diol of formula (IX) in which X represents a bivalent aliphatic group or a bivalent cyclic aliphatic group. On the other hand, when $Z^1$ and $Z^2$ each represents a substituted or unsubstituted arylene group, there can be employed any bivalent groups derived from the substituted or unsubstituted aryl group as previously defined in the description of $Ar^1$, $Ar^2$, $Ar^3$ and $Ar^4$.

Preferable examples of the diol of formula (IX) in which X represents a bivalent aromatic group are as follows:

bis(4-hydroxyphenyl)methane,
bis(2-methyl-4-hydroxyphenyl)methane,
bis(3-methyl-4-hydroxyphenyl)methane,
1,1-bis(4-hydroxyphenyl)ethane,
1,2-bis(4-hydroxyphenyl)ethane,
bis(4-hydroxyphenyl)phenylmethane,
bis(4-hydroxyphenyl)diphenylmethane,
1,1-bis(4-hydroxyphenyl)-1-phenylethane,
1,3-bis(4-hydroxyphenyl)-1,1-dimethylpropane,
2,2-bis(4-hydroxyphenyl)propane,
2-(4-hydroxyphenyl)-2-(3-hydroxyphenyl)propane,
1,1-bis(4-hydroxyphenyl)-2-methylpropane,
2,2-bis(4-hydroxyphenyl)butane,
1,1-bis(4-hydroxyphenyl)-3-methylbutane,
2,2-bis(4-hydroxyphenyl)pentane,
2,2-bis(4-hydroxyphenyl)-4-methylpentane,
2,2-bis(4-hydroxyphenyl)hexane,
4,4-bis(4-hydroxyphenyl)heptane,
2,2-bis(4-hydroxyphenyl)nonane,
bis(3,5-dimethyl-4-hydroxyphenyl)methane,
2,2-bis(3-methyl-4-hydroxyphenyl)propane,
2,2-bis(3-isopropyl-4-hydroxyphenyl)propane,
2,2-bis(3-sec-butyl-4-hydroxyphenyl)propane,
2,2-bis(3-tert-butyl-4-hydroxyphenyl)propane,
2,2-bis(3-cyclohexyl-4-hydroxyphenyl)propane,
2,2-bis(3-allyl-4-hydroxyphenyl)propane,
2,2-bis(3-phenyl-4-hydroxyphenyl)propane,
2,2-bis(3,5-dimethyl-4-hydroxyphenyl)propane,
2,2-bis(3-chloro-4-hydroxyphenyl)propane,
2,2-bis(3,5-dichloro-4-hydroxyphenyl)propane,
2,2-bis(3-bromo-4-hydroxyphenyl)propane,
2,2-bis(3,5-dibromo-4-hydroxyphenyl)propane,
2,2-bis(4-hydroxyphenyl)hexafluorpropane,
1,1-bis(4-hydroxyphenyl)cyclopentane,
1,1-bis(4-hydroxyphenyl)cyclohexane,
1,1-bis(3-methyl-4-hydroxyphenyl)cyclohexane,
1,1-bis(3,5-dimethyl-4-hydroxyphenyl)cyclohexane,
1,1-bis(3,5-dichloro-4-hydroxyphenyl)cyclohexane,
1,1-bis(4-hydroxyphenyl)-3,3,5-trimethylcyclohexane,
1,1-bis(4-hydroxyphenyl)cycloheptane,
2,2-bis(4-hydroxyphenyl)norbornane,
2,2-bis(4-hydroxyphenyl)adamantane,
4,4'-dihydroxydiphenyl ether,
4,4'-dihydroxy-3,3'-dimethyldiphenyl ether,
ethylene glycol bis(4-hydroxyphenyl)ether,
4,4'-dihydroxydiphenylsulfide,
3,3'-dimethyl-4,4'-dihydroxydiphenylsulfide,
3,3',5,5'-tetramethyl-4,4'-dihydroxydiphenylsulfide,
4,4'-dihydroxydiphenylsulfoxide,
3,3'-dimethyl-4,4'-dihydroxydiphenylsulfoxide,
4,4'-dihydroxydiphenylsulfone,
3,3'-dimethyl-4,4'-dihydroxydiphenylsulfone,
3,3'-diphenyl-4,4'-dihydroxydiphenylsulfone,
3,3'-dichloro-4,4'-dihydroxydiphenylsulfone,
bis(4-hydroxyphenyl)ketone,
bis(3-methyl-4-hydroxyphenyl)ketone,
3,3,3',3'-tetramethyl-6,6'-dihydroxyspiro(bis)indane,
3,3',4,4'-tetrahydro-4,4,4',4'-tetramethyl-2,2'-spirobi(2H-1-benzopyrane-7,7'-diol,
trans-2,3-bis(4-hydroxyphenyl)-2-butene,
9,9-bis(4-hydroxyphenyl)fluorene,
9,9-bis(4-hydroxyphenyl)xanthene,
1,6-bis(4-hydroxyphenyl)-1,6-hexanedione,
α,α,α',α'-tetramethyl-α,α'-bis(4-hydroxyphenyl)-p-xylene,
α,α,α',α'-tetramethyl-α,α'-bis(4-hydroxyphenyl)-m-xylene,
2,6-dihydroxydibenzo-p-dioxine,
2,6-dihydroxythianthrene,
2,7-dihydroxyphenoxathine,
9,10-dimethyl-2,7-dihydroxyphenazine,
3,6-dihydroxydibenzofuran,
3,6-dihydroxydibenzothiophene,
4,4'-dihydroxybiphenyl,
1,4-dihydroxynaphthalene,
2,7-dihydroxypyrene,
hydroquinone,
resorcin,
ethylene glycol-bis(4-hydroxybenzoate),
diethylene glycol-bis(4-hydroxybenzoate),
triethylene glycol-bis(4-hydroxybenzoate),
1,3-bis(4-hydroxyphenyl)-tetramethyldisiloxane, and
phenol-modified silicone oil.

Further, an aromatic diol having an ester linkage produced by the reaction between 2 moles of a diol and one mole of isophthaloyl chloride or terephthaloyl chloride is also usable.

In the polycarbonate copolymer resin comprising the structural unit of formula (I) and the structural unit of formula (II), the molar ratio of a moiety composed of the structural unit of formula (I) may be freely determined, but preferably 5 mol % or more, more preferably 20 mol % or more with respect to the total amount of the polycarbonate resin because the content of the structural unit of formula (I) has an effect on the charge transporting properties of the obtained polycarbonate resin.

In the photoconductors according to the present invention, at least one of the previously mentioned aromatic polycarbonate resins is contained in the photoconductive layers 2, 2a, 2b, 2c, 2d, and 2e. The aromatic polycarbonate resin can be employed in different ways, for example, as shown in FIGS. 1 through 6.

In the photoconductor as shown in FIG. 1, a photoconductive layer 2 is formed on an electroconductive support 1, which photoconductive layer 2 comprises an aromatic polycarbonate resin of the present invention and a sensitizing dye, with the addition thereto of a binder agent (binder resin) when necessary. In this photo-conductor, the aromatic polycarbonate resin works as a photoconductive material, through which charge carriers necessary for the light decay of the photoconductor are generated and transported. However, the aromatic polycarbonate resin itself scarcely absorbs light in the visible light range, and therefore, it is necessary to add a sensitizing dye which absorbs light in the visible light range in order to form latent electrostatic images by use of visible light.

Figure 2:
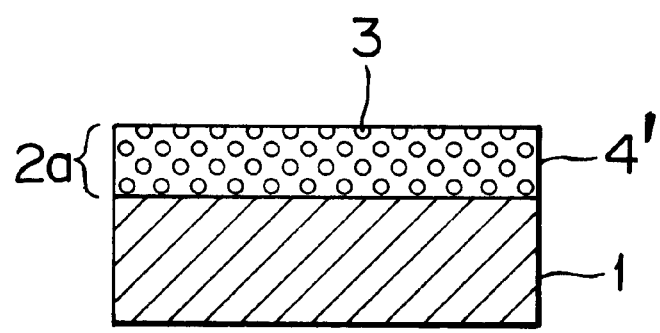
FIG. 2 is a schematic cross-sectional view of a second example of an electrophotographic photoconductor according to the present invention.

Referring to FIG. 2, there is shown an enlarged cross-sectional view of another embodiment of an electrophotographic photoconductor according to the present invention. In this photoconductor, there is formed a photoconductive layer 2a on an electroconductive support 1. The photoconductive layer 2a comprises a charge transport medium 4' comprising (i) an aromatic polycarbonate resin of the present invention, optionally in combination with a binder agent, and (ii) a charge generation material 3 dispersed in the charge transport medium 4'. In this embodiment, the aromatic poly-carbonate resin (or a mixture of the aromatic poly-carbonate resin and the binder agent) constitutes the charge transport medium 4'. The charge generation material 3, which is, for example, an inorganic material or an organic pigment, generates charge carriers. The charge transport medium 4' accepts the charge carriers generated by the charge generation material 3 and transports those charge carriers.

In this electrophotographic photoconductor, it is basically necessary that the light-absorption wavelength regions of the charge generation material 3 and the aromatic polycarbonate resin not overlap in the visible light range. This is because, in order that the charge generation material 3 produce charge carriers efficiently, it is necessary that light pass through the charge transport medium 4' and reach the surface of the charge generation material 3. Since the aromatic polycarbonate resin comprising the structural unit of formula (I) do not substantially absorb light with a wavelength of 600 nm or more, it can work effectively as the charge transport material when used in combination with the charge generation material 3 which can absorb the light in the visible region to the near infrared region and generate charge carriers. The charge transport medium 4' may further comprise a low-molecular weight charge transport material.

Figure 3:
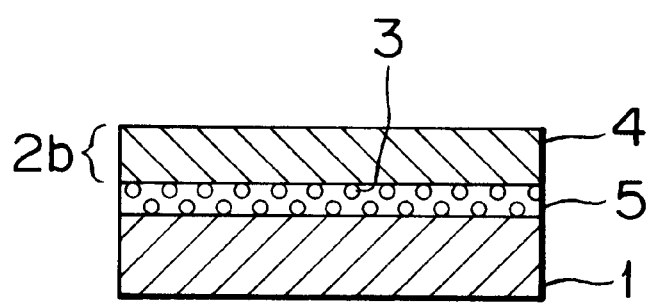
FIG. 3 is a schematic cross-sectional view of a third example of an electrophotographic photoconductor according to the present invention.

Referring to FIG. 3, there is shown an enlarged cross-sectional view of a further embodiment of an electrophotographic photoconductor according to the present invention. In the figure, there is formed on an electroconductive support 1 a two-layered photoconductive layer 2b comprising a charge generation layer 5 containing the charge generation material 3, and a charge transport layer 4 comprising an aromatic polycarbonate resin with the charge transporting properties according to the present invention.

In this photoconductor, light which has passed through the charge transport layer 4 reaches the charge generation layer 5, and charge carriers are generated within the charge generation layer 5. The charge carriers which are necessary for the light decay for latent electrostatic image formation are generated by the charge generation material 3, and accepted and transported by the charge transport layer 4. The generation and transportation of the charge carriers are performed by the same mechanism as that in the photoconductor shown in FIG. 2.

In this case, the charge transport layer 4 comprises the aromatic polycarbonate resin, optionally in combination with a binder agent. In order to increase the efficiency of generating the charge carriers, the charge generation layer 5 may further comprise the aromatic polycarbonate resin of the present invention. Furthermore, the photoconductive layer 2b including the charge generation layer 5 and the charge transport layer 4 may further comprise a low-molecular weight charge transport material. This can be applied to the embodiments of FIGS. 4 to 6 to be described later.

Figure 4:
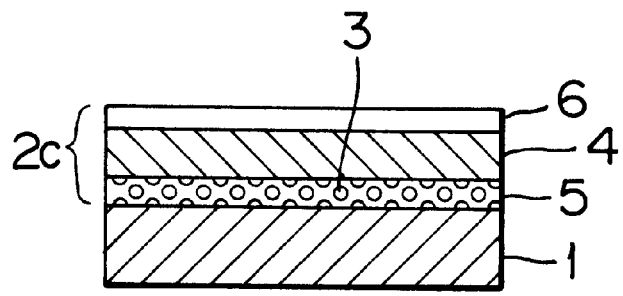
FIG. 4 is a schematic cross-sectional view of a fourth example of an electrophotographic photoconductor according to the present invention.

In the electrophotographic photoconductor of FIG. 3, a protective layer 6 may be provided on the charge transport layer 4 as shown in FIG. 4. The protective layer 6 may comprise the aromatic polycarbonate resin of the present invention, optionally in combination with a binder agent. In such a case, it is effective that the protective layer 6 be provided on a charge transport layer in which a low-molecular weight charge transport material is dispersed. The protective layer 6 may be provided on the photoconductive layer 2a of the photoconductor as shown in FIG. 2.

Figure 5:
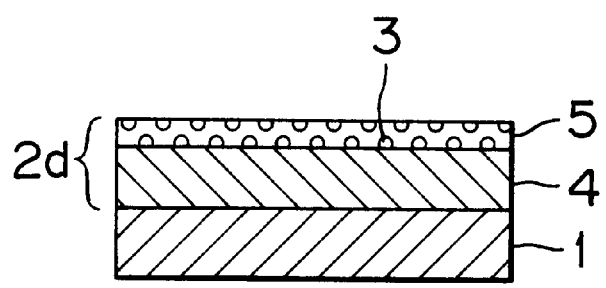
FIG. 5 is a schematic cross-sectional view of a fifth example of an electrophotographic photoconductor according to the present invention.

Referring to FIG. 5, there is shown still another embodiment of an electrophotographic photoconductor according to the present invention. In this figure, the overlaying order of the charge generation layer 5 and the charge transport layer 4 comprising the aromatic poly-carbonate resin is reversed in view of the electrophoto-graphic photoconductor as shown in FIG. 3. The mechanism of the generation and transportation of charge carriers is substantially the same as that of the photoconductor shown in FIG. 3.

Figure 6:
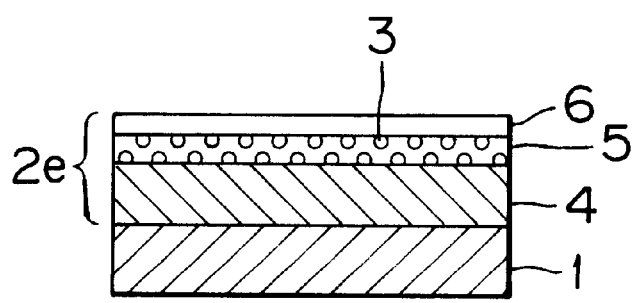
FIG. 6 is a schematic cross-sectional view of a sixth example of an electrophotographic photoconductor according to the present invention.

In the above photoconductor of FIG. 5, a protective layer 6 may be formed on the charge generation layer 5 as shown in FIG. 6 in light of the mechanical strength of the photoconductor.

When the electrophotographic photoconductor according to the present invention as shown in FIG. 1 is fabricated, at least one aromatic polycarbonate resin of the present invention is dissolved in a solvent, with the addition thereto of a binder agent when necessary. To the thus prepared solution, a sensitizing dye is added, so that a photoconductive layer coating liquid is prepared. The thus prepared photoconductive layer coating liquid is coated on an electroconductive support 1 and dried, so that a photoconductive layer 2 is formed on the electroconductive support 1.

It is preferable that the thickness of the photoconductive layer 2 be in the range of 3 to 50 μm, more preferably in the range of 5 to 40 μm.

It is preferable that the amount of aromatic polycarbonate resin of the present invention be in the range of 30 to 100 wt. % of the total weight of the photoconductive layer 2. It is preferable that the amount of sensitizing dye for use in the photoconductive layer 2 be in the range of 0.1 to 5 wt. %, more preferably in the range of 0.5 to 3 wt. % of the total weight of the photoconductive layer 2.

Specific examples of the sensitizing dye for use in the present invention are triarylmethane dyes such as Brilliant Green, Victoria Blue B, Methyl Violet, Crystal Violet and Acid Violet 6B; xanthene dyes such as Rhodamine B, Rhodamine 6G, Rhodamine G Extra, Eosin S, Erythrosin, Rose Bengale and Fluoresceine; thiazine dyes such as Methylene Blue; and cyanine dyes such as cyanin.

The electrophotographic photoconductor shown in FIG. 2 can be fabricated by the following method:

The finely-divided particles of the charge generation material 3 are dispersed in a solution in which at least one aromatic polycarbonate resin of the present invention, or a mixture of the aromatic polycarbonate resin and the binder agent is dissolved, so that a coating liquid for the photoconductive layer 2a is prepared. The coating liquid thus prepared is coated on the electroconductive support 1 and then dried, whereby the photoconductive layer 2a is provided on the electroconductive support 1.

It is preferable that the thickness of the photoconductive layer 2a be in the range of 3 to 50 μm, more preferably in the range of 5 to 40 μm.

It is preferable that the amount of aromatic polycarbonate resin with the charge transporting properties be in the range of 40 to 100 wt. % of the total weight of the photoconductive layer 2a. It is preferable that the amount of charge generation material 3 for use in the photoconductive layer 2a be in the range of 0.1 to 50 wt. %, more preferably in the range of 1 to 20 wt. % of the total weight of the photoconductive layer 2a.

Specific examples of the charge generation material 3 for use in the present invention are as follows: inorganic materials such as selenium, selenium—tellurium, cadmium sulfide, cadmium sulfide—selenium and α-silicon (amorphous silicon); and organic pigments, for example, azo pigments, such as C.I. Pigment Blue 25 (C.I. 21180), C.I. Pigment Red 41 (C.I. 21200), C.I. Acid Red 52 (C.I. 45100), C.I. Basic Red 3 (C.I. 45210), an azo pigment having a carbazole skeleton (Japanese Laid-Open Patent Application 53-95033), an azo pigment having a distyryl benzene skeleton (Japanese Laid-Open Patent Application 53-133445), an azo pigment having a triphenylamine skeleton (Japanese Laid-Open Patent Application 53-132347), an azo pigment having a dibenzothiophene skeleton (Japanese Laid-Open Patent Application 54-21728), an azo pigment having an oxadiazole skeleton (Japanese Laid-Open Patent Application 54-12742), an azo pigment having a fluorenone skeleton (Japanese Laid-Open Patent Application 54-22834), an azo pigment having a bisstilbene skeleton (Japanese Laid-Open Patent Application 54-17733), an azo pigment having a distyryl oxadiazole skeleton (Japanese Laid-Open Patent Application 54-2129), and an azo pigment having a distyryl carbazole skeleton (Japanese Laid-Open Patent Application 54-14967); phthalocyanine pigments such as C.I. Pigment Blue 16 (C.I. 74100); indigo pigments such as C.I. Vat Brown 5 (C.I. 73410) and C.I. Vat Dye (C.I. 73030); and perylene pigments such as Algol Scarlet B and Indanthrene Scarlet R (made by Bayer Co., Ltd.). These charge generation materials may be used alone or in combination.

When the electrophotographic photoconductor of the present invention comprises a phthalocyanine pigment as the charge generation material, the sensitivity and durability of the obtained photoconductor are remarkably improved. In this case, there can be employed a phthalocyanine pigment having a phthalocyanine skeleton represented by the following formula:

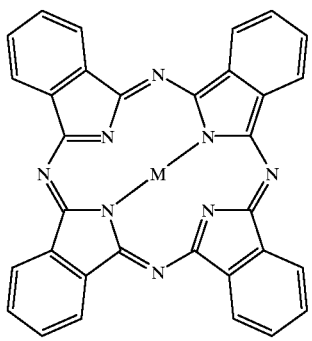

In the above formula, M (central atom) is a metal atom or a hydrogen atom.

To be more specific, as the central atom (M) in the formula, there can be employed an atom of H, Li, Be, Na, Mg, Al, Si, K, Ca, Sc, Ti, V, Cr, Mn, Fe, Co, Ni, Cu. Zn, Ga, Ge, Y, Zr, Mb, Mo, Tc, Ru, Rh, Pd, Ag, Cd, In, Sn, Sb, Ba, Hf, Ta, W, Re, Os, Ir, Pt, Au, Hg, Tl, La, Ce, Pr, Nd, Pm, Sm, Eu, Gd, Tb, Dy, Ho, Er, Tm, Yb, Lu, Th, Pa, U, Np or Am; the combination of two or more atoms constituting an oxide, chloride, fluoride, hydroxide or bromide. The central atom is not limited to the above-mentioned atoms.

The above-mentioned phthalocyanine pigment for use in the present invention, which has at least the basic structure as indicated by the above-mentioned formula, may have a dimer structure or trimer structure, and further, a polymeric structure. Further, the basic structure of the above-mentioned formula may have a substituent.

Of the phthalocyanine compounds represented by the aforementioned formula, an oxotitanium phthalocyanine compound which has the central atom (M) of TiO in the above formula, and a metal-free phthalocyanine compound which has a hydrogen atom as the central atom (M) are particularly preferred in the present invention because the obtained photoconductors show excellent photoconductive properties.

In addition, it is known that each phthalocyanine compound has a variety of crystal systems. For example, the above-mentioned oxotitanium phthalocyanine has crystal systems of α-type, β-type, γ-type, m-type, and y-type. In the case of copper phthalocyanine, there are crystal systems of α-type, β-type, and γ-type. The properties of the phthalocyanine compound vary depending on the crystal system thereof although the central metal atom is the same. According to the report of "Electrophotography—the Society Journal—Vol. 29, No. 4 (1990)", the properties of the photoconductor vary depending on the crystal system of a phthalocyanine contained in the photoconductor. In light of the desired photoconductive properties, therefore, it is important to select the phthalocyanine in the optimal crystal system. The oxotitanium phthalocyanine in the y-type crystal system is particularly advantageous.

The above-mentioned charge generation materials with phthalocyanine skeleton may be used in combination in the charge generation layer. Further, such charge generation materials with phthalocyanine skeleton may be used in combination with other charge generation materials. In this case, inorganic and organic conventional charge generation materials can be employed.

Specific examples of the inorganic charge generation material are crystalline selenium, amorphous selenium, selenium—tellurium, selenium—tellurium—halogen, selenium—arsenic compound, and a-silicon (amorphous silicon) In particular, when the above-mentioned a-silicon is employed as the charge generation material, it is preferable that the dangling bond be terminated with hydrogen atom or a halogen atom, or be doped with boron atom or phosphorus atom.

Specific examples of the organic charge generation material which can be used in combination with the phthalocyanine compound are azulenium salt pigment, squaric acid methyne pigment, azo pigment having a carbazole skeleton, azo pigment having a triphenylamine skeleton, azo pigment having a diphenylamine skeleton, azo pigment having a dibenzothiophene skeleton, azo pigment having a fluorenone skeleton, azo pigment having an oxadiazole skeleton, azo pigment having a bisstilbene skeleton, azo pigment having a distyryl oxadiazole skeleton, azo pigment having a distyryl carbazole skeleton, perylene pigment, anthraquinone pigment, polycyclic quinone pigment, quinone imine pigment, diphenylmethane pigment, triphenylmethane pigment, benzoquinone pigment, naphthoquinone pigment, cyanine pigment, azomethine pigment, indigoid pigment, and bisbenzimidazole pigment.

The electrophotographic photoconductor shown in FIG. 3 can be fabricated by the following method:

To provide the charge generation layer 5 on the electroconductive support 1, the charge generation material is vacuum-deposited on the electroconductive support 1. Alternatively, the finely-divided particles of the charge generation material 3 are dispersed in an appropriate solvent, together with the binder agent when necessary, so that a coating liquid for the charge generation layer 5 is prepared. The thus prepared coating liquid is coated on the electroconductive support 1 and dried, whereby the charge generation layer 5 is formed on the electroconductive support 1. The charge generation layer 5 may be subjected to surface treatment by buffing and adjustment of the thickness thereof if required. On the thus formed charge generation layer 5, a coating liquid in which at least one aromatic poly-carbonate resin with the charge transporting properties according to the present invention, optionally in combination with a binder agent is dissolved is coated and dried, so that the charge transport layer 4 is formed on the charge generation layer 5. In the charge generation layer 5, the same charge generation materials as employed in the above-mentioned photoconductive layer 2a can be used.

The thickness of the charge generation layer 5 is 5 μm or less, preferably 2 μm or less. It is preferable that the thickness of the charge transport layer 4 be in the range of 3 to 50 μm, more preferably in the range of 5 to 40 μm.

When the charge generation layer 5 is provided on the electroconductive support 1 by coating the dispersion in which finely-divided particles of the charge generation material 3 are dispersed in an appropriate solvent, it is preferable that the amount of finely-divided particles of the charge generation material 3 for use in the charge generation layer 5 be in the range of 10 to 100 wt. %, more preferably in the range of about 50 to 100 wt. % of the total weight of the charge generation layer 5. It is preferable that the amount of aromatic polycarbonate resin of the present invention 4 be in the range of 40 to 100 wt. % of the total weight of the charge transport layer 4.

As previously mentioned, the photoconductive layer 2b may comprise a low-molecular weight charge transport material.

Examples of the low-molecular weight charge transport material for use in the present invention are as follows:

oxazole derivatives, oxadiazole derivatives (Japanese Laid-Open Patent Applications 52-139065 and 52-139066), imidazole derivatives, triphenylamine derivatives (Japanese Laid-Open Patent Application 3-285960), benzidine derivatives (Japanese Patent Publication 58-32372), α-phenylstilbene derivatives (Japanese Laid-Open Patent Application 57-73075), hydrazone derivatives (Japanese Laid-Open Patent Applications 55-154955, 55-156954, 55-52063, and 56-81850), triphenylmethane derivatives (Japanese Patent Publication 51-10983), anthracene derivatives (Japanese Laid-Open Patent Application 51-94829), styryl derivatives (Japanese Laid-Open Patent Applications 56-29245 and 58-198043), carbazole derivatives (Japanese Laid-Open Patent Application 58-58552), and pyrene derivatives (Japanese Laid-Open Patent Application 2-94812).

To fabricate the photoconductor as shown in FIG. 4, a coating liquid for the protective layer 6 is prepared by dissolving the aromatic polycarbonate resin of the present invention, optionally in combination with the binder agent, in a solvent, and the thus obtained coating liquid is coated on the charge transport layer 4 of the photoconductor shown in FIG. 3, and dried.

It is preferable that the thickness of the protective layer 6 be in the range of 0.15 to 10 μm. It is preferable that the amount of aromatic polycarbonate resin of the present invention for use in the protective layer 6 be in the range of 40 to 100 wt. % of the total weight of the protective layer 6.

The electrophotographic photoconductor as shown in FIG. 5 can be fabricated by the following method:

The aromatic polycarbonate resin of the present invention, optionally in combination with the binder agent, is dissolved in a solvent to prepare a coating liquid for the charge transport layer 4. The thus prepared coating liquid is coated on the electroconductive support 1 and dried, whereby the charge transport layer 4 is provided on the electroconductive support 1. On the thus formed charge transport layer 4, a coating liquid prepared by dispersing the finely-divided particles of the charge generation material 3 in a solvent in which the binder agent may be dissolved when necessary, is coated by spray coating and dried, so that the charge generation layer 5 is provided on the charge transport layer 4. The amount ratios of the components contained in the charge generation layer 5 and charge transport layer 4 are the same as those previously described in the description of FIG. 3.

When the protective layer 6 is formed on the above prepared charge generation layer 5 in the same manner as mentioned in the description of FIG. 4, the electrophotographic photoconductor with such a structure as shown in FIG. 6 can be fabricated.

To fabricate any of the aforementioned photoconductors of the present invention, a metallic plate or foil made of aluminum, a plastic film on which a metal such as aluminum is deposited, and a sheet of paper which has been treated so as to be electroconductive can be employed as the electroconductive support 1.

Specific examples of the binder agent used in the preparation of the photoconductor according to the present invention are condensation resins such as polyamide, polyurethane, polyester, epoxy resin, polyketone and polycarbonate; and vinyl polymers such as polyvinylketone, polystyrene, poly-N-vinylcarbazole and polyacrylamide. All the resins that have electrically insulating properties and adhesion properties can be employed.

Some plasticizers may be added to the above-mentioned binder agent, when necessary. Examples of the plasticizer for use in the present invention are halogenated paraffin, dimethylnaphthalene and dibutyl phthalate. Further, a variety of additives such as an antioxidant, a light stabilizer, a thermal stabilizer and a lubricant may also be contained in the binder agent when necessary.

Furthermore, in the electrophotographic photoconductor according to the present invention, an intermediate layer such as an adhesive layer or a barrier layer may be interposed between the electroconductive support and the photoconductive layer when necessary.

Examples of the material for use in the intermediate layer are polyamide, nitrocellulose, aluminum oxide and titanium oxide. It is preferable that the thickness of the intermediate layer be 1 μm or less.

When copying is performed by use of the photoconductor according to the present invention, the surface of the photoconductor is uniformly charged to a predetermined polarity in the dark. The uniformly charged photoconductor is exposed to a light image so that a latent electrostatic image is formed on the surface of the photoconductor. The thus formed latent electrostatic image is developed to a visible image by a developer, and the developed image can be transferred to a sheet of paper when necessary.

The photosensitivity and the durability of the electrophotographic photoconductor according to the present invention are remarkably improved.

Other features of this invention will become apparent in the course of the following description of exemplary embodiments, which are given for illustration of the invention and are not intended to be limiting thereof.

SYNTHESIS EXAMPLE 1

[Synthesis of Stilbene Compound]

7.59 g (0.002 mol) of N,N-bis(3-hydroxyphenyl)stilbene-4-amine, 22.44 g (0.12 mol) of m-bromoanisole, 22.12 g (0.16 mol) of potassium carbonate, and 1.26 g of activated copper powder were added to 40 ml of nitrobenzene, and the above prepared mixture was stirred for 4 hours at 170° C. in a stream of nitrogen.

Thereafter, the reaction mixture was allowed to stand at room temperature, and 200 ml of toluene was added to the reaction mixture. The resulting insoluble material was removed from the reaction mixture by filtration, and the solvent was distilled away from the reaction mixture under reduced pressure, whereby 10.3 g of a black oily material was obtained.

This oily material was chromatographed on silica gel and eluted with a mixed solvent of toluene and n-hexane (at a ratio by volume of 2:1), so that N,N-bis[3-(3-methoxyphenoxy)phenyl]stilbene-4-amine represented by the following formula was obtained as a light yellow oily material in a yield of 9.0 g.

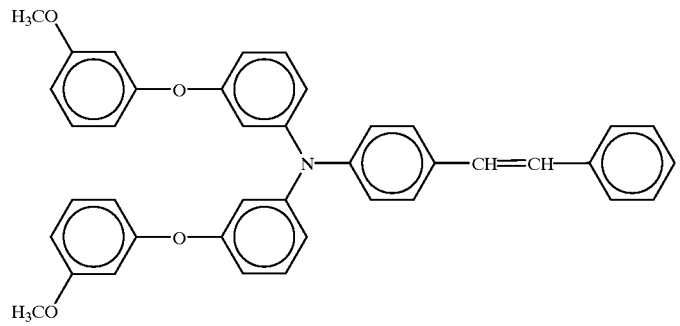

The results of the elemental analysis of the thus obtained product were as follows:

|  | % C | % H | % N |
|---|---|---|---|
| Found | 81.44 | 5.70 | 2.39 |
| Calculated | 81.20 | 5.62 | 2.37 |

NMR (CDCl$_3$); δ 3.76 (S, 6H, OCH$_3$x2)

SYNTHESIS EXAMPLE 2

(Synthesis of Diol Compound)

A mixture of 1.60 g (0.02 mol) of the stilbene compound synthesized in Synthesis Example 1, and 10.0 g (0.11 mol) of sodium thioethoxide was added to 180 ml of dry N,N-dimetylformamide and refluxed for 2.5 hours in a stream of nitrogen.

Then, the reaction mixture was allowed to stand at room temperature, and poured into 350 ml of water. The reaction mixture was neutralized with concentrated hydrochloric acid. The resultant precipitate was extracted with ethyl acetate, and the thus obtained organic layer was washed with water and the solvent was distilled away from the reaction mixture, thereby obtaining a brown oily material.

This material was chromatographed on silica gel and eluted with a mixed solvent of toluene and ethyl acetate (at a ratio by volume of 5:1), So that N,N-bis[3-(3-hydroxyphenoxy)phenyl]stilbene-4-amine represented by the following formula was obtained as colorless crystals in the form of needles in a yield of 8.27 g.

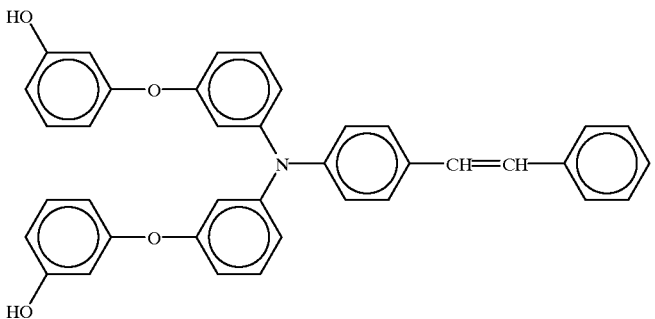

The melting point of this diol compound was 126.3° C. (endothermic peak by TG-DTA).

The results of the elemental analysis of the thus obtained product were as follows:

|  | % C | % H | % N |
|---|---|---|---|
| Found | 80.90 | 5.24 | 2.51 |
| Calculated | 80.96 | 5.20 | 2.49 |

Figure 7:
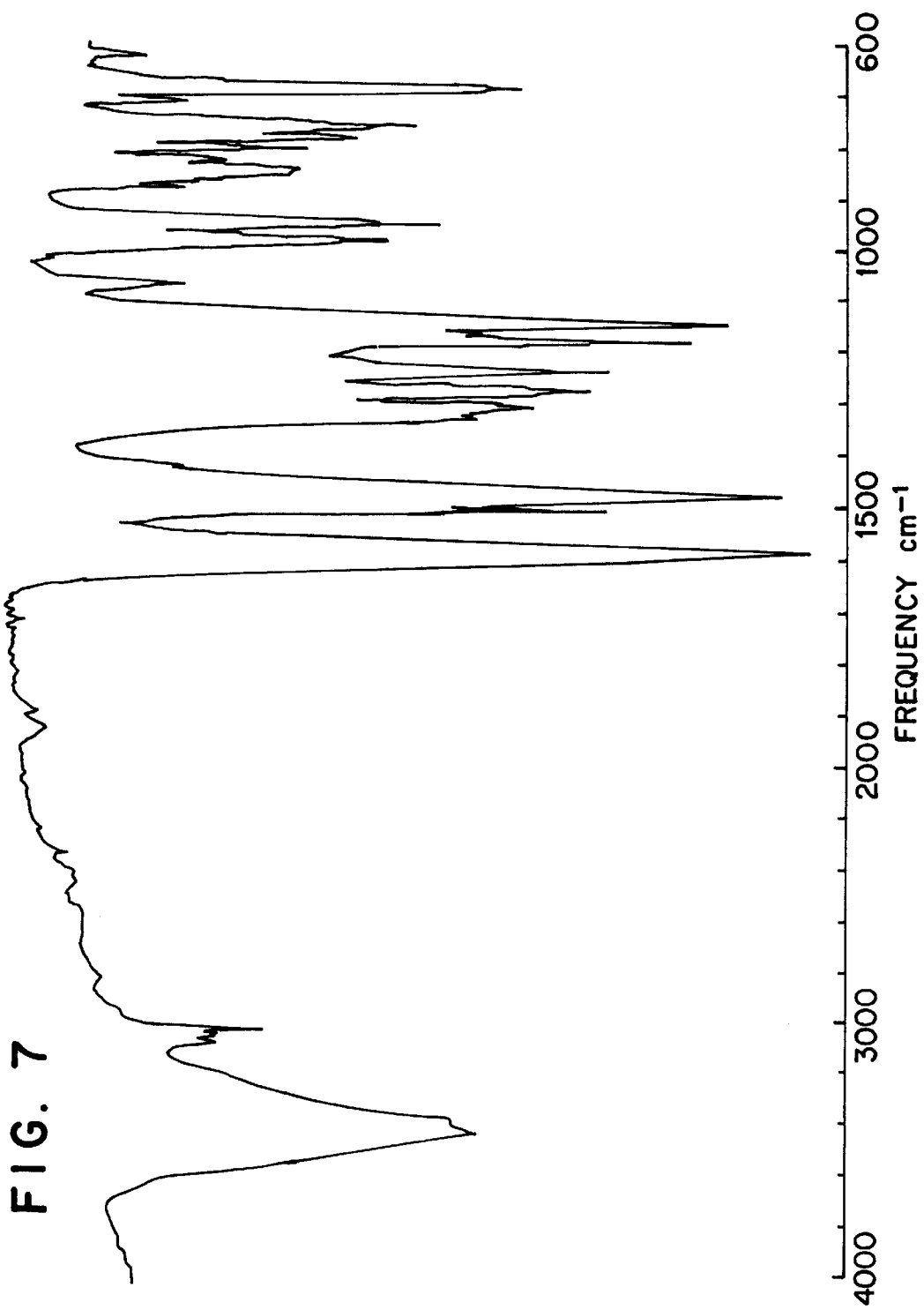
FIG. 7 is an IR spectrum of a diol compound synthesized in Synthesis Example 2, taken by use of a KBr tablet.

FIG. 7 is an infrared spectrum of the above prepared diol by use of a KBr tablet.

EXAMPLE 1-1
[Synthesis of Aromatic Polycarbonate Resin No. 1]

2.50 parts of a diol with the charge transporting properties, that is, N,N-bis[3-(3-hydroxyphenoxy)phenyl]-stilbene-4-amine synthesized in Synthesis Example 2, 1.87 parts of a copolymerizable diol, that is, 2,2-bis(4-hydroxyphenyl)propane, and 0.0155 parts of a molecular weight modifier, that is, 4-tert-butylphenol were placed in a reaction container with stirrer.

With the addition of an aqueous solution prepared by dissolving 2.61 parts of sodium hydroxide and 0.046 parts of sodium hydrosulfite in 30.7 parts of water, the obtained reaction mixture was dissolved with stirring in a stream of nitrogen under the application of heat thereto.

Thereafter, the reaction mixture was cooled to 20° C. and vigorously stirred, with a solution prepared by dissolving 1.50 parts of bis(trichloromethyl)carbonate, that is a trimer of a phosgene, in 25.6 parts of dichloromethane being added to the reaction mixture, whereby the polymerization reaction was carried out as the emulsion was formed.

The reaction mixture was then stirred for 15 minutes at room temperature. With the addition of 0.0064 parts of triethylamine, the reaction mixture was further stirred for 60 minutes at room temperature. Then, a solution prepared by dissolving 0.10 parts of phenyl chloroformate in 5 parts of dichloromethane was added to the reaction mixture, and the resultant mixture was stirred for 120 minutes at room temperature.

Thereafter, by the addition of 250 parts of dichloromethane to the reaction mixture, an organic layer was separated. The resultant organic layer was successively washed with a 3% aqueous solution of sodium hydroxide, a 2% aqueous solution of hydrochloric acid, and water.

The thus obtained organic layer was added dropwise to large quantities of methanol, whereby a white polycarbonate resin was precipitated.

Thus, a polycarbonate resin No. 1 (in the form of a random copolymer) according to the present invention was obtained.

The structural units for use in the polycarbonate resin are shown in TABLE 1 and the moiety ratio of each structural unit is put beside the structural unit in TABLE 1.

TABLE 1 also shows the results of the elemental analysis of the obtained polycarbonate resin. The polycarbonate resin was identified as a polycarbonate random copolymer comprising the above-mentioned structural units through the elemental analysis.

The glass transition temperature (Tg) of the above obtained aromatic polycarbonate resin No. 1 was 120.9° C. when measured by use of a differential scanning calorimeter.

The polystyrene-reduced number-average molecular weight (Mn) and weight-average molecular weight (Mw), which were measured by the gel permeation chromatography, were respectively 70,287 and 133,089.

Figure 8:
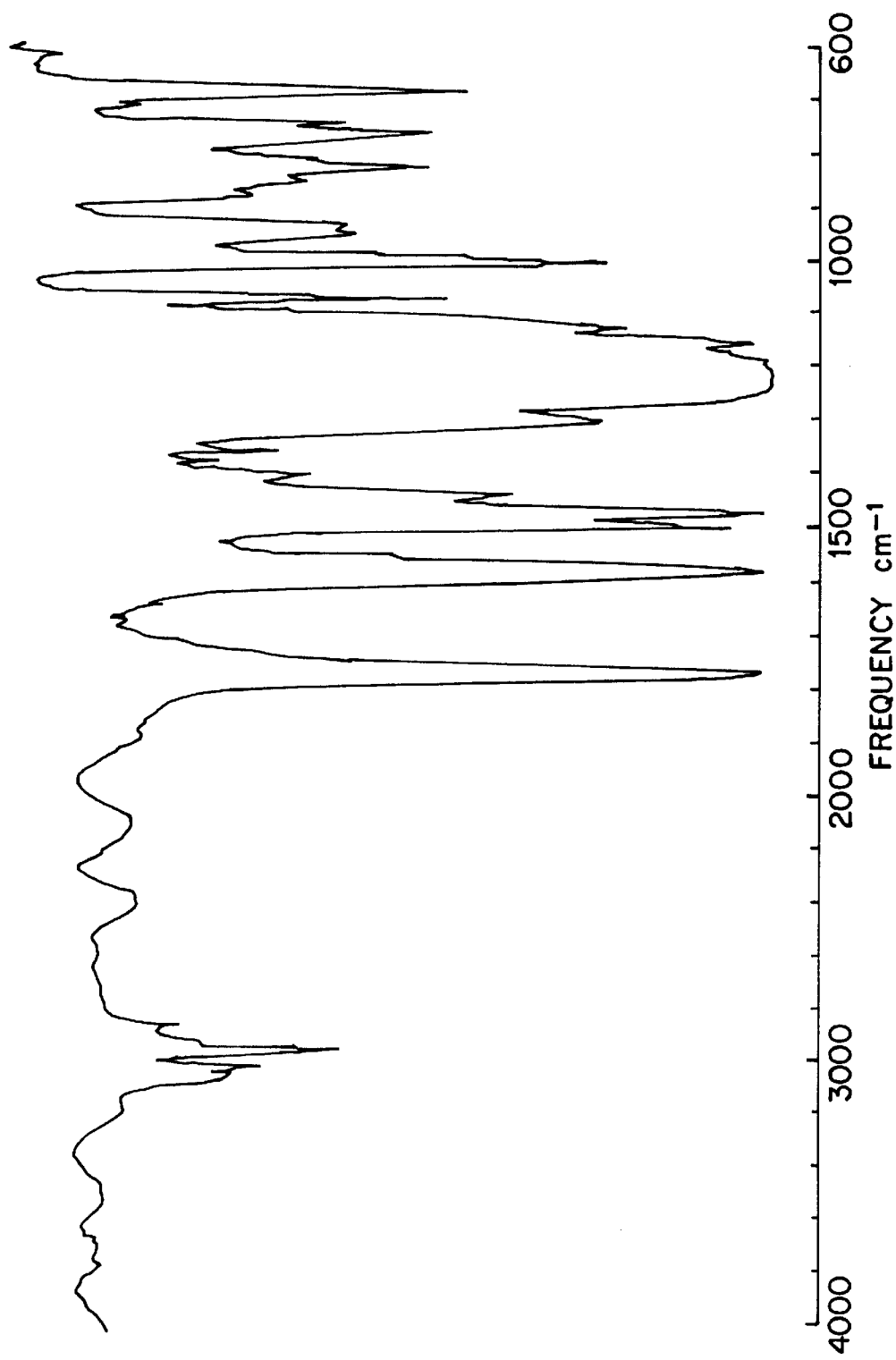
FIGS. 8 to 10 are IR spectra of aromatic polycarbonate resins according to the present invention, respectively synthesized in Examples 1-1 to 1-3, taken by use of a thin-film.

FIG. 8 shows an infrared spectrum of the aromatic polycarbonate resin No. 1, measured by the thin film method.

EXAMPLES 1-2 and 1-3

[Synthesis of Aromatic Polycarbonate Resins No. 2 and No. 3]

The procedure for preparation of the aromatic polycarbonate resin No. 1 in Example 1-1 was repeated except that 2,2-bis(4-hydroxyphenyl)propane employed in Example 1-1 was replaced by the respective diol compounds as shown in TABLE 1, and the amount ratios between the two diols were respectively changed.

Thus, aromatic polycarbonate resins No. 2 and No. 3 according to the present invention were obtained. The structure of each polycarbonate resin is shown in TABLE 1.

The results of the elemental analysis, the polystyrene-reduced number-average molecular weight (Mn) and weight-average molecular weight (Mw), and the glass transition temperature (Tg) of each polycarbonate resin are also shown in TABLE 1.

Figure 9:
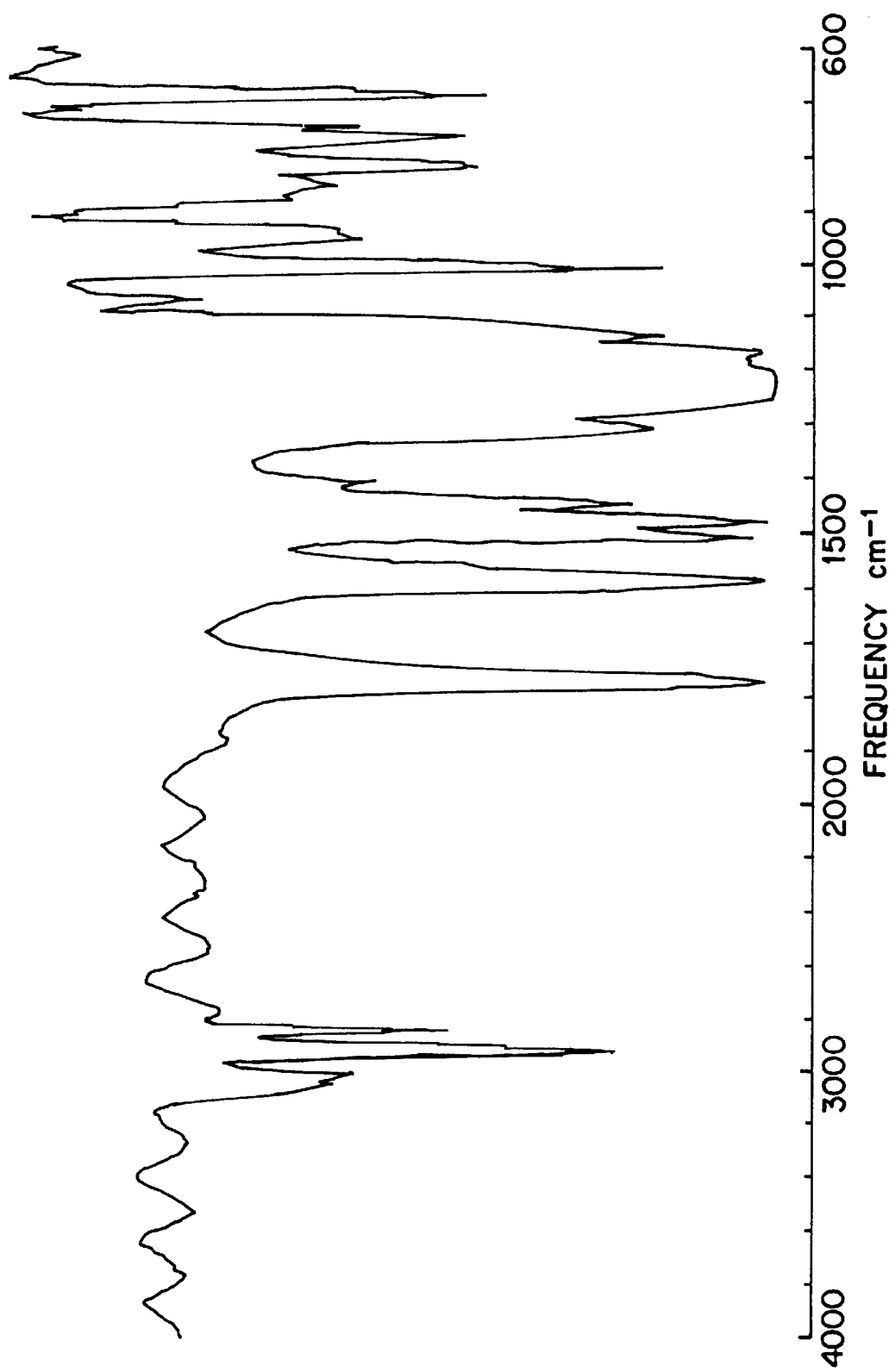
Figure 10:
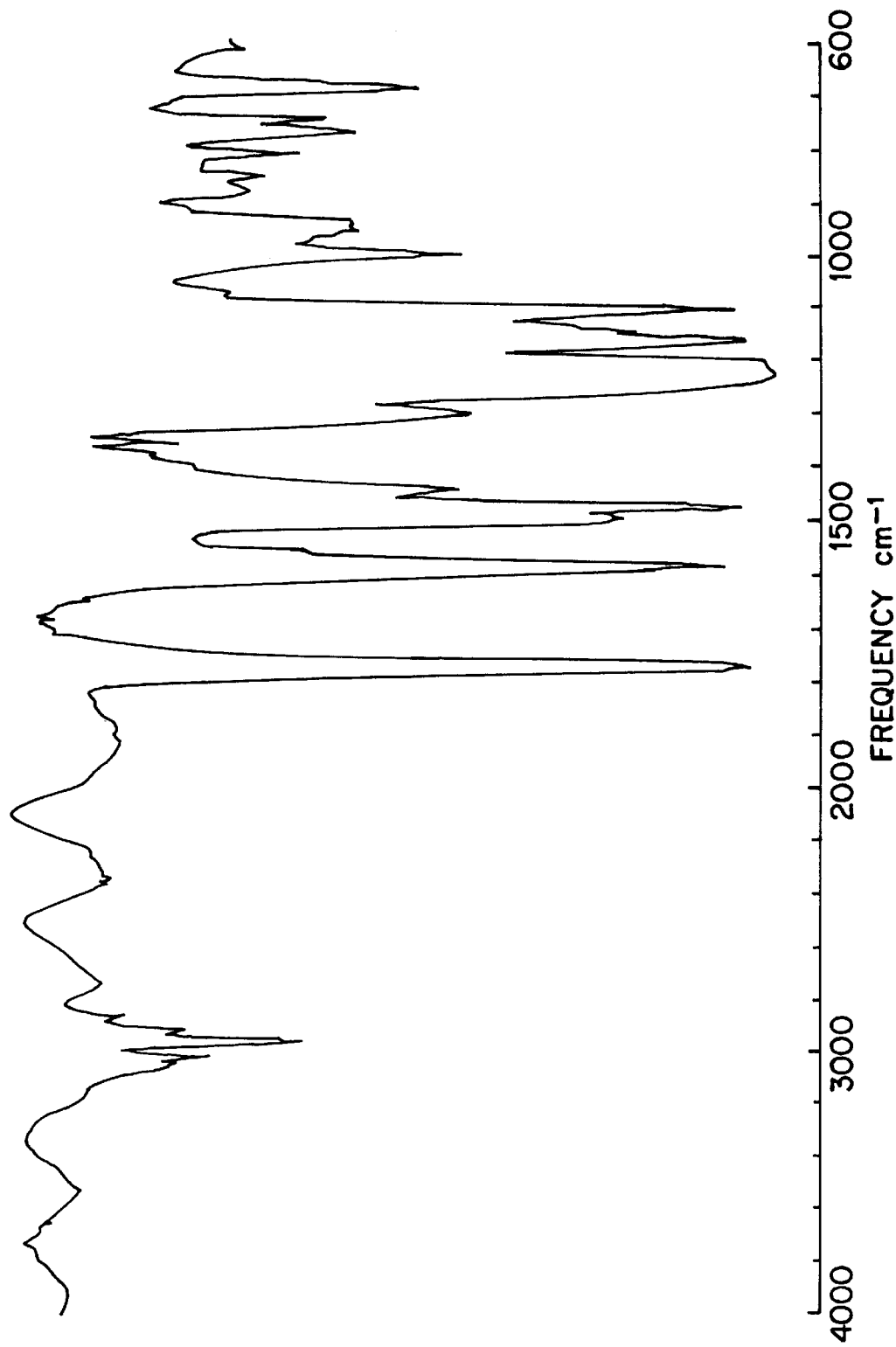

Infrared spectra of the aromatic polycarbonate resins No. 2 and No. 3, measured by the thin film method, are respectively shown in FIGS. 9 and 10.

TABLE 1
| Example No. | Polycarbonate Resin No. | Structure of Polycarbonate Resin | Molecular Weight | | Elemental Analysis | | | | | | Tg (° C.) |
| --- | --- | --- | --- | --- | --- | --- | --- | --- | --- | --- | --- |
| | | | Mn | Mw | % C Found | (Calcd.) | % H Found | (Calcd.) | % N Found | (Calcd.) | |
| 1-1 | 1 | 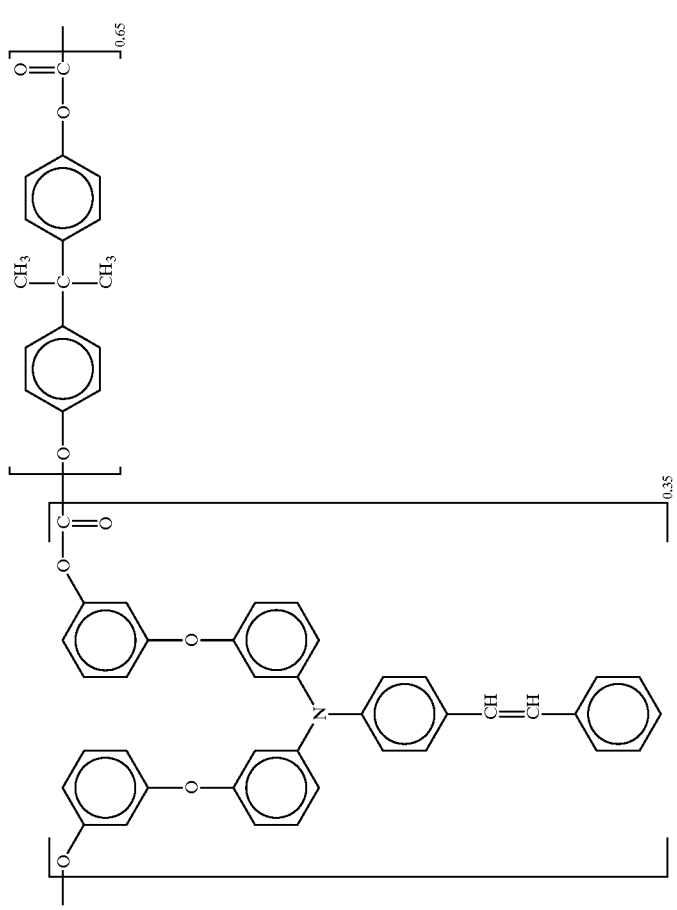 | 70287 | 133089 | 77.58 | (77.73) | 5.12 | (5.03) | 1.28 | (1.32) | 120.9 |

TABLE 1-continued

| Example No. | Polycarbonate Resin No. | Structure of Polycarbonate Resin | Molecular Weight | | Elemental Analysis | | | | | | Tg (° C.) |
|---|---|---|---|---|---|---|---|---|---|---|---|
| | | | Mn | Mw | % C Found | (Calcd.) | % H Found | (Calcd.) | % N Found | (Calcd.) | |
| 1-2 | 2 | (structure shown) | 32608 | 125338 | 78.24 | (78.17) | 5.39 | (5.42) | 1.31 | (1.32) | 128.9 |

TABLE 1-continued
| Example No. | Polycarbonate Resin No. | Structure of Polycarbonate Resin | Molecular Weight Mn | Mw | Elemental Analysis % C Found (Calcd.) | % H Found (Calcd.) | % N Found (Calcd.) | Tg (° C.) |
|---|---|---|---|---|---|---|---|---|
| 1-3 | 3 | 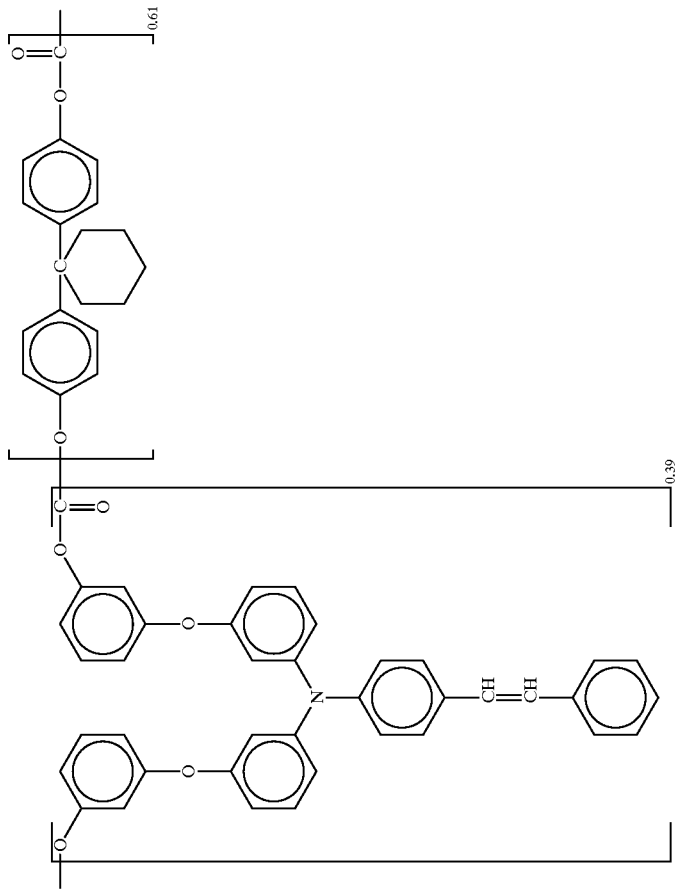 | 44525 | 174240 | 78.49 (78.59) | 5.28 (5.30) | 1.35 (1.32) | 114.2 |

EXAMPLE 2-1

[Fabrication of Photoconductor No. 1]

(Formation of Intermediate Layer)

A commercially available polyamide resin (Trademark "CM-8000", made by Toray Industries, Inc.) was dissolved in a mixed solvent of methanol and butanol, so that a coating liquid for an intermediate layer was prepared.

The thus prepared coating liquid was coated on an aluminum plate by a doctor blade, and dried at room temperature, so that an intermediate layer with a thickness of 0.3 μm was provided on the aluminum plate.

(Formation of Charge Generation Layer)

A coating liquid for a charge generation layer was prepared by pulverizing and dispersing a bisazo compound of the following formula, serving as a charge generation material, in a mixed solvent of cyclohexanone and 2-butanone using a ball mill. The thus obtained coating liquid was coated on the above prepared intermediate layer by a doctor blade, and dried at room temperature.

Thus, a charge generation layer with a thickness of 0.5 μm was formed on the intermediate layer.

<Bisazo compound>

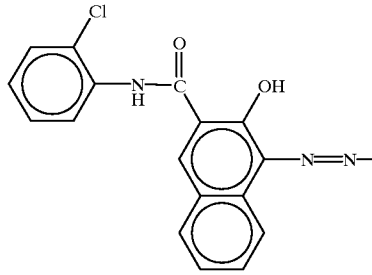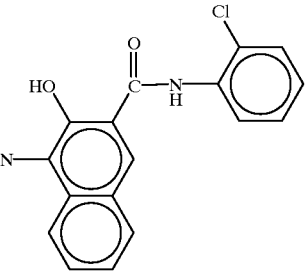

(Formation of Charge Transport Layer)

The aromatic polycarbonate resin No. 1 of the present invention prepared in Example 1-1, serving as a charge transport material, was dissolved in dichloromethane, so that a coating liquid for a charge transport layer was prepared. The thus obtained coating liquid was coated on the above prepared charge generation layer by a doctor blade, and dried at room temperature and then at 120° C. for 20 minutes, so that a charge transport layer with a thickness of 20 μm was provided on the charge generation layer.

Thus, an electrophotographic photoconductor No. 1 according to the present invention was fabricated.

EXAMPLES 2-2 and 2-3

The procedure for fabrication of the electrophotographic photoconductor No. 1 in Example 2-1 was repeated except that the aromatic polycarbonate resin No. 1 for use in the charge transport layer coating liquid in Example 2-1 was replaced by the aromatic polycarbonate resins No. 2 and No. 3 synthesized in Examples 1-2 and 1-3, respectively.

Thus, electrophotographic photoconductors No. 2 and No. 3 according to the present invention were fabricated.

Each of the electrophotographic photoconductors No. 1 to No. 3 according to the present invention respectively fabricated in Examples 2-1 to 2-3 was charged negatively in the dark under application of −6 kV of corona charge for 20 seconds, using a commercially available electrostatic copying sheet testing apparatus ("Paper Analyzer Model SP-428" made by Kawaguchi Electro Works Co., Ltd.). The surface potential (Vm) of each photoconductor was measured.

Then, each electrophotographic photoconductor was allowed to stand in the dark for 20 seconds without applying any charge thereto, and the surface potential (Vo) of the photoconductor was measured.

Each photoconductor was then illuminated by a tungsten lamp in such a manner that the illuminance on the illuminated surface of the photoconductor was 4.5 lux, and the exposure $E_{1/2}$ (lux·sec) required to reduce the initial surface potential Vo (V) to ½ the initial surface potential Vo (V) was measured.

The results are shown in TABLE 2.

TABLE 2

| Example No. | Poly-carbonate Resin No. | −Vm (V) | −Vo (V) | $E_{1/2}$ (lux · sec) |
|---|---|---|---|---|
| 2-1 | No. 1 | 1546 | 1332 | 1.34 |
| 2-2 | No. 2 | 1517 | 1323 | 1.60 |
| 2-3 | No. 3 | 1534 | 1327 | 1.40 |

Furthermore, each of the above obtained electrophotographic photoconductors No. 1 to No. 3 was set in a commercially available electrophotographic copying machine, and the photoconductor was charged and exposed to light images via the original images to form latent electrostatic images thereon. Then, the latent electrostatic images formed on the photoconductor were developed into visible toner images by a dry developer, and the visible toner images were transferred to a sheet of plain paper and fixed thereon. As a result, clear toner images were obtained on the paper. When a wet developer was employed for the image formation, clear images were formed on the paper similarly.

The previously mentioned aromatic polycarbonate resin of the present invention, which is remarkably effective as the photoconductive material for use in the electrophotographic photoconductor, is optically or chemically sensitized with a sensitizer such as a dye or Lewis acid. In particular, the polycarbonate resin can effectively function as the charge transport material in the function-separating type electrophotographic photoconductor.

The above-mentioned polycarbonate resin is provided with the charge transporting properties. Therefore, the photosensitivity and durability of the photoconductor can be improved when the aforementioned polycarbonate resin is contained in the photoconductive layer.

Japanese Patent Applications No. 09-162642 and No. 09-162667 filed Jun. 19, 1997 are hereby incorporated by reference.

What is claimed is:

1. An electrophotographic photoconductor comprising an electroconductive support, and a photoconductive layer formed thereon comprising as an effective component an aromatic polycarbonate resin comprising a structural unit of formula (I):

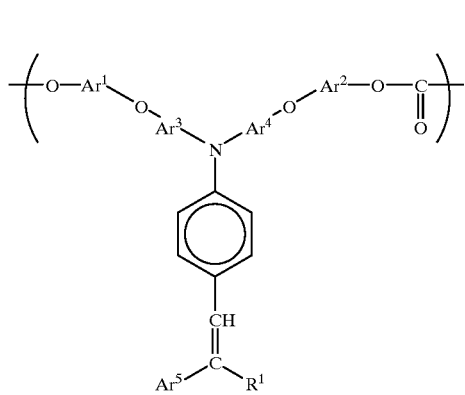

wherein $Ar^1$, $Ar^2$, $Ar^3$ and $Ar^4$ are each an arylene group which may have a substituent; $Ar^5$ is an aryl group which may have a substituent; and $R^1$ is a hydrogen atom, an alkyl group having 1 to 4 carbon atoms which may have a substituent, or an aryl group which may have a substituent.

2. The electrophotographic photoconductor as claimed in claim 1, wherein said structural unit of formula (I) is represented by formula (III):

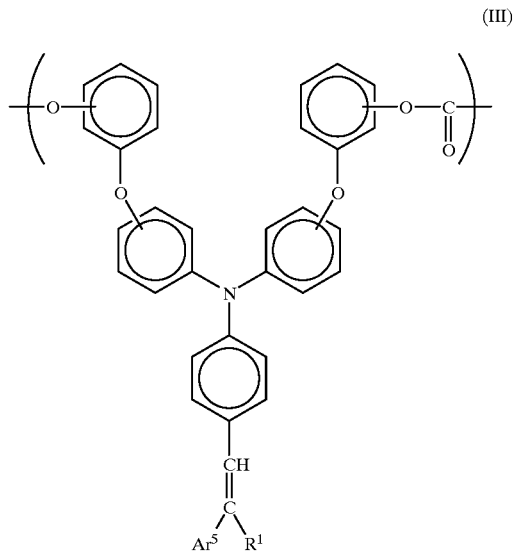

wherein $Ar^5$ and $R^1$ are respectively the same as defined in formula (I).

3. The electrophotographic photoconductor as claimed in claim 2, wherein said structural unit of formula (III) is represented by formula (IV):

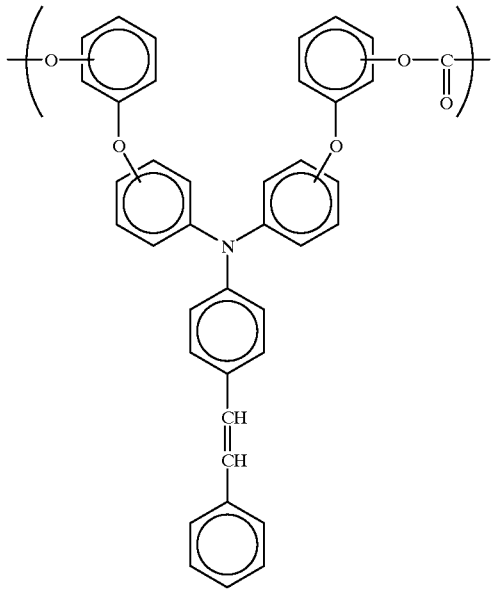

4. An electrophotographic photoconductor comprising an electroconductive support, and a photoconductive layer formed thereon comprising as an effective component an aromatic polycarbonate resin comprising a structural unit of formula (I) and a structural unit of formula (II), with a composition ratio of said structural unit of formula (I) to said structural unit of formula (II) satisfying a relationship of $0<k/(k+j)\leq 1$, wherein k is a moiety ratio of said structural unit of formula (I) and j is a moiety ratio of said structural unit of formula (II):

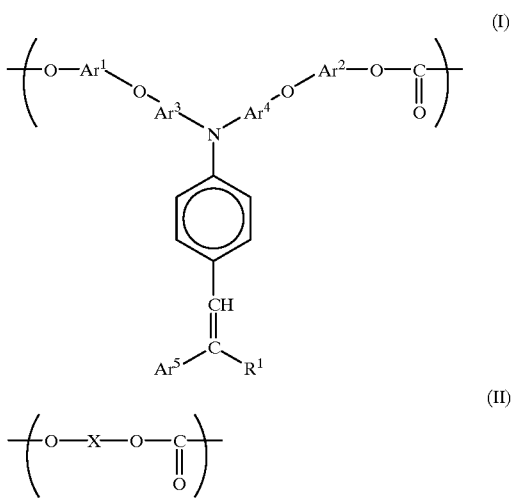

wherein $Ar^1$, $Ar^2$, $Ar^3$ and $Ar^4$ are each an arylene group which may have a substituent; $Ar^5$ is an aryl group which may have a substituent; $R^1$ is a hydrogen atom, an alkyl group having 1 to 4 carbon atoms which may have a substituent, or an aryl group which may have a substituent; and X is a bivalent aliphatic group, a bivalent cyclic aliphatic group, a bivalent aromatic group, a bivalent group obtained by bonding said bivalent groups, or

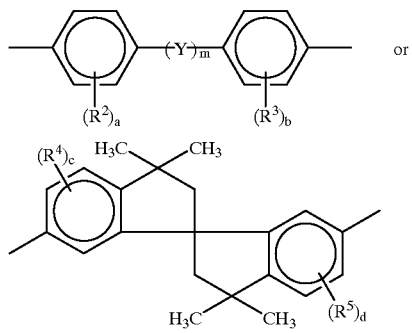

in which $R^2$, $R^3$, $R^4$ and $R^5$ are each independently an alkyl group which may have a substituent, an aryl group which may have a substituent, or a halogen atom; a and b are each independently an integer of 0 to 4; c and d are each independently an integer of 0 to 3; and m is an integer of 0 or 1, provided that when m=1, Y is a straight-chain alkylene group having 2 to 12 carbon atoms, —O—, —S—, —SO—, —SO$_2$—, —CO—,

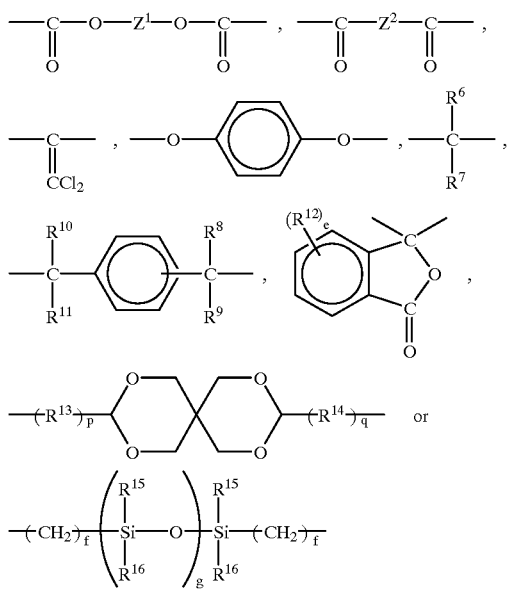

in which $Z^1$ and $Z^2$ are each a bivalent aliphatic group which may have a substituent or an arylene group which may have a substituent; and $R^6$, $R^7$, $R^8$, $R^9$, $R^{10}$, $R^{11}$ and $R^{12}$ are each independently a hydrogen atom, a halogen atom, an alkyl group having 1 to 5 carbon atoms which may have a substituent, an alkoxyl group having 1 to 5 carbon atoms which may have a substituent, or an aryl group which may have a substituent, and $R^6$ and $R^7$ may form a carbocyclic ring or heterocyclic ring having 6 to 12 carbon atoms together, or may form a carbocyclic ring or heterocyclic ring in combination with $R^2$ and $R^3$; p and q are each an integer of 0 or 1, provided that when p and q represent 1, $R^{13}$ and $R^{14}$ are each an alkylene group having 1 to 4 carbon atoms; $R^{15}$ and $R^{16}$ are each independently an alkyl group having 1 to 5 carbon atoms which may have a substituent, or an aryl group which may have a substituent; e is an integer of 0 to 4; f is an integer of 0 to 20; and g is an integer of 0 to 2000.

5. The electrophotographic photoconductor as claimed in claim 4, wherein said structural unit of formula (I) is represented by formula (III):

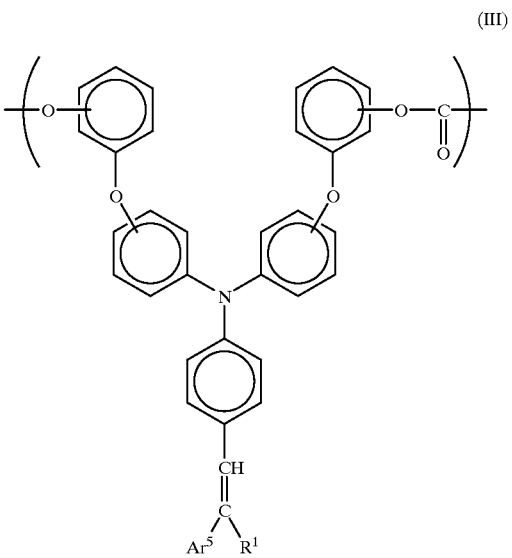

wherein $Ar^5$ and $R^1$ are respectively the same as defined in formula (I).

6. The electrophotographic photoconductor as claimed in claim 5, wherein said structural unit of formula (III) is represented by formula (IV):

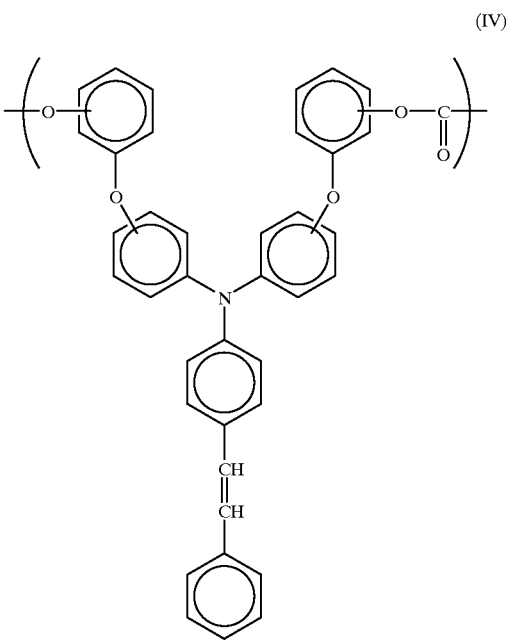

* * * * *

UNITED STATES PATENT AND TRADEMARK OFFICE
CERTIFICATE OF CORRECTION

PATENT NO. : 6,066,428

DATED : May 23, 2000

INVENTOR(S): Akira KATAYAMA et al.

It is certified that an error appears in the above-identified patent and that said Letters Patent is hereby corrected as shown below:

Column 9, line 7, "dial" should read --diol--;
        line 17, "dial" should read --diol--; and
        line 28, "dial" should read --diol--.

Column 10, line 54, "2,2-dimethylpropicnic acid," should read --2,2-dimethylpropionic acid,--.

Column 15, line 40, "III)," should read --II),--.

Column 22, line 21, "Mb," should read --Nb,--.

Signed and Sealed this

Tenth Day of April, 2001

Attest:

NICHOLAS P. GODICI

Attesting Officer      Acting Director of the United States Patent and Trademark Office